US011936101B2

(12) United States Patent
Terashita et al.

(10) Patent No.: US 11,936,101 B2
(45) Date of Patent: Mar. 19, 2024

(54) ANTENNA DEVICE

(71) Applicant: YOKOWO CO., LTD., Tokyo (JP)

(72) Inventors: Noritaka Terashita, Tomioka (JP); Yusuke Yokota, Tomioka (JP); Kazuya Fujimaki, Tomioka (JP)

(73) Assignee: YOKOWO CO., LTD., Tokyo (JP)

(*) Notice: Subject to any disclaimer, the term of this patent is extended or adjusted under 35 U.S.C. 154(b) by 0 days.

(21) Appl. No.: 18/109,874

(22) Filed: Feb. 15, 2023

(65) Prior Publication Data

US 2023/0198135 A1 Jun. 22, 2023

Related U.S. Application Data

(63) Continuation of application No. 16/587,726, filed on Sep. 30, 2019, now Pat. No. 11,600,909, which is a (Continued)

(30) Foreign Application Priority Data

Mar. 31, 2017 (JP) ................................ 2017-072310

(51) Int. Cl.
*H01Q 1/32* (2006.01)
*H01Q 1/52* (2006.01)
(Continued)

(52) U.S. Cl.
CPC ........... *H01Q 1/3275* (2013.01); *H01Q 1/521* (2013.01); *H01Q 5/307* (2015.01); *H01Q 11/08* (2013.01); *H01Q 1/42* (2013.01)

(58) Field of Classification Search
CPC ...... H01Q 1/3275; H01Q 5/307; H01Q 1/521; H01Q 11/08; H01Q 1/42
See application file for complete search history.

(56) References Cited

U.S. PATENT DOCUMENTS 6,239,753 B1 5/2001 Kado et al.
6,259,411 B1 7/2001 Yanagisawa et al.
(Continued)

FOREIGN PATENT DOCUMENTS

CN 101939876 A 1/2011
GB 2522988 A 8/2015
(Continued)

OTHER PUBLICATIONS

International Search Report and Written Opinion dated Apr. 17, 2018 for PCT/JP2018/003291 filed on Jan. 31, 2018, 9 pages.
(Continued)

*Primary Examiner* — Graham P Smith
(74) *Attorney, Agent, or Firm* — XSENSUS LLP

(57) ABSTRACT

An antenna device includes a first antenna and a second antenna provided in a case. The first antenna includes a first capacitance loading element and is configured to at least one of receive and transmit a signal in a first frequency band. The second antenna includes a second capacitance loading element and is configured to at least one of receive and transmit a signal in a second frequency band. The second frequency band is higher than the first frequency band. The second capacitance loading element is disposed at a front side of the first capacitance loading element.

10 Claims, 24 Drawing Sheets

Related U.S. Application Data continuation of application No. PCT/JP2018/003291, filed on Jan. 31, 2018.

(51) Int. Cl.

| | |
|---|---|
| ***H01Q 5/307*** | (2015.01) |
| ***H01Q 11/08*** | (2006.01) |
| *H01Q 1/42* | (2006.01) |

(56) References Cited

U.S. PATENT DOCUMENTS

| | | | | |
|---|---|---|---|---|
| 6,421,015 | B1 | 7/2002 | Chen | |
| 2002/0067316 | A1 | 6/2002 | Yokoshima et al. | |
| 2002/0118143 | A1 | 8/2002 | Yokoshima et al. | |
| 2006/0114159 | A1 | 6/2006 | Yoshikawa et al. | |
| 2007/0285335 | A1 | 12/2007 | Bungo et al. | |
| 2010/0265147 | A1 | 10/2010 | Wakui et al. | |
| 2012/0081253 | A1 | 4/2012 | Duzdar et al. | |
| 2012/0188143 | A1 | 7/2012 | Yang et al. | |
| 2012/0223862 | A1 | 9/2012 | Kerselaers | |
| 2012/0326934 | A1 | 12/2012 | Wakui et al. | |
| 2012/0326935 | A1* | 12/2012 | Kang | H01Q 9/36 343/713 |
| 2013/0176180 | A1 | 7/2013 | Nakui et al. | |
| 2013/0229315 | A1 | 9/2013 | Duzdar et al. | |
| 2013/0342405 | A1 | 12/2013 | Ueno et al. | |
| 2014/0125549 | A1 | 5/2014 | Kaneko | |
| 2014/0125550 | A1 | 5/2014 | Kaneko | |
| 2014/0159964 | A1 | 6/2014 | Kaneko | |
| 2015/0122005 | A1 | 5/2015 | Nakatani | |
| 2015/0200446 | A1 | 7/2015 | Kaneko | |
| 2015/0349409 | A1 | 12/2015 | Imamura | |
| 2015/0357705 | A1 | 12/2015 | Ito | |
| 2016/0064807 | A1 | 3/2016 | Reed et al. | |
| 2016/0315378 | A1 | 10/2016 | Kiriyama et al. | |
| 2017/0062914 | A1 | 3/2017 | Masaka et al. | |
| 2018/0183143 | A1 | 6/2018 | Hall et al. | |
| 2018/0241120 | A1 | 8/2018 | Li | |
| 2020/0028249 | A1 | 1/2020 | Terashita et al. | |

FOREIGN PATENT DOCUMENTS

| | | | |
|---|---|---|---|
| JP | 2010-21856 | A | 1/2010 |
| JP | 2012-199865 | A | 10/2012 |
| JP | 2012-204996 | A | 10/2012 |
| JP | 2013-106146 | A | 5/2013 |
| JP | 2015-115742 | A | 6/2015 |
| JP | 2016-12915 | A | 1/2016 |
| JP | 2016-116048 | A | 6/2016 |
| JP | 2016-208291 | A | 12/2016 |
| JP | 2016-208383 | A | 12/2016 |
| KR | 2013-0055380 | A | 5/2013 |
| WO | 2012/127734 | A1 | 9/2012 |
| WO | 2014/003078 | A1 | 1/2014 |
| WO | 2016/175171 | A1 | 11/2016 |

OTHER PUBLICATIONS

Extended European search report dated Nov. 3, 2020, in corresponding European patent Application No. 18778312.1, 8 pages.

Office Action dated Jun. 15, 2021 in Chinese Patent Application No. 201880023025.X, 15 pages.

Japanese Notice of Reasons for Refusal dated Aug. 31, 2021 in Japanese Application No. 2019-508663.

Chinese Office Action dated Feb. 11, 2022 in Chinese Application No. 201880023025.X.

Office Action dated Jul. 5, 2022, in corresponding Chinese patent Application No. 201880023025.X, 26 pages.

Office Action dated Oct. 11, 2022, in corresponding Japanese patent Application No. 2021-199149, 8 pages.

* cited by examiner

ANTENNA DEVICE

CROSS-REFERENCE TO RELATED APPLICATIONS

This application is a continuation of U.S. application Ser. No. 16/587,726, filed Sep. 30, 2019, which is a continuation application based on PCT Application No. PCT/JP2018/003291, filed on Jan. 31, 2018, which claims priority to Japanese Patent Application No. 2017-072310, filed on Mar. 31, 2017, the entire contents of each are incorporated herein by its reference.

BACKGROUND

The present invention relates to an antenna device that is equipped with a capacitance loading element.

In recent years, vehicular antenna devices called shark fin antennas have been being developed. As for vehicular antenna devices, there is a tendency of equipping them with a DAB (digital audio broadcast) antenna in addition to an AM/FM broadcast reception antenna (refer to Patent document 1 below, for example).

Patent document 1: JP-A-2012-199865

SUMMARY

One aspect of the invention is an antenna device. An antenna device, includes

- a first antenna and a second antenna provided in a case, wherein
- the first antenna includes a first capacitance loading element and serves for at least reception and transmission of signal at a first frequency band,
- the second antenna includes a second capacitance loading element and serves for at least reception and transmission of signal at a second frequency band,
- the second frequency band is higher than the first frequency band, and
- the second capacitance loading element is disposed at a front side of the first capacitance loading element.

Desired combinations of the above constituent elements and methods, systems, etc. obtained by converting the above expressions of the invention are also effective as modes of the invention.

DETAILED DESCRIPTION OF EXEMPLIFIED EMBODIMENTS

Figure 1:
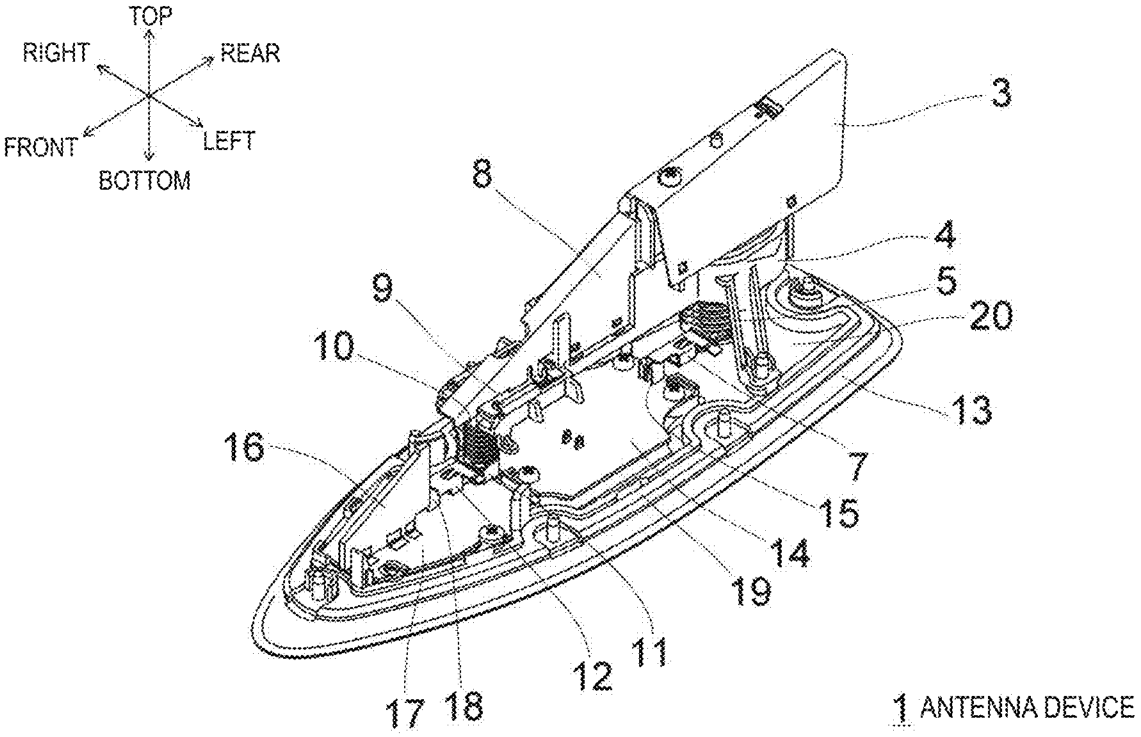
FIG. 1 is a perspective view of an antenna device 1 according to a first embodiment of the present invention with an outer case 2 omitted.

Preferred embodiments of the present invention will be hereinafter described in detail with reference to the drawings. The same or equivalent constituent elements, members, etc. shown in the drawings are given the same symbol and redundant descriptions therefor will be avoided as appropriate. The embodiments are just examples and are not intended to restrict the invention, and not all features described in the embodiments and combinations thereof are essential to the invention.

Embodiment 1

Figure 2:
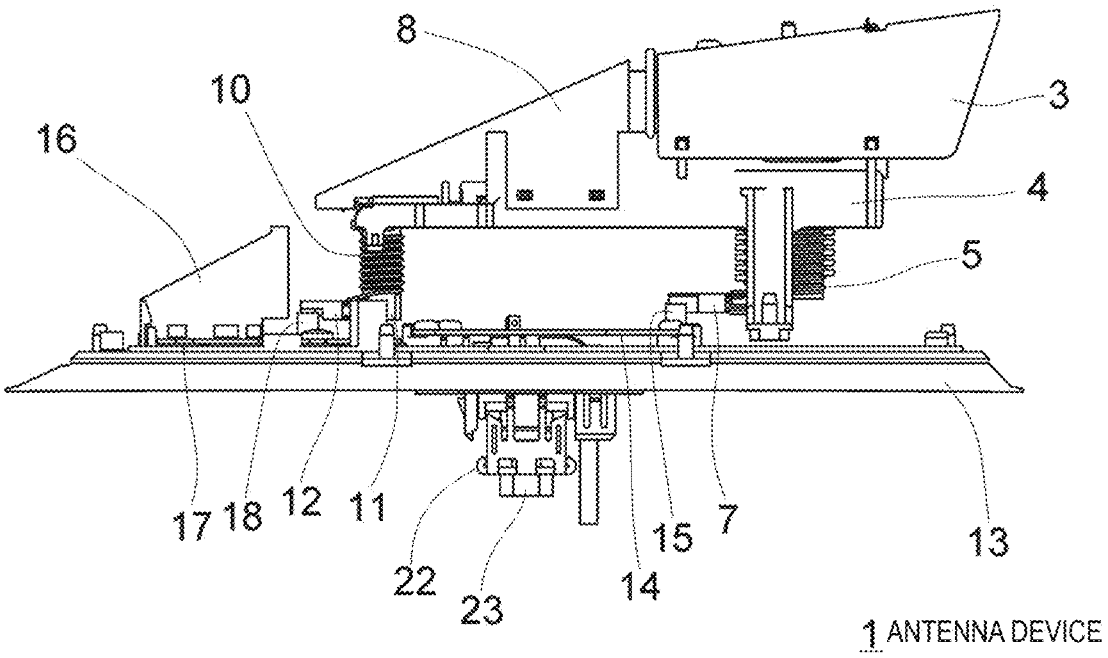
FIG. 2 is a left side view of the same.
Figure 3:
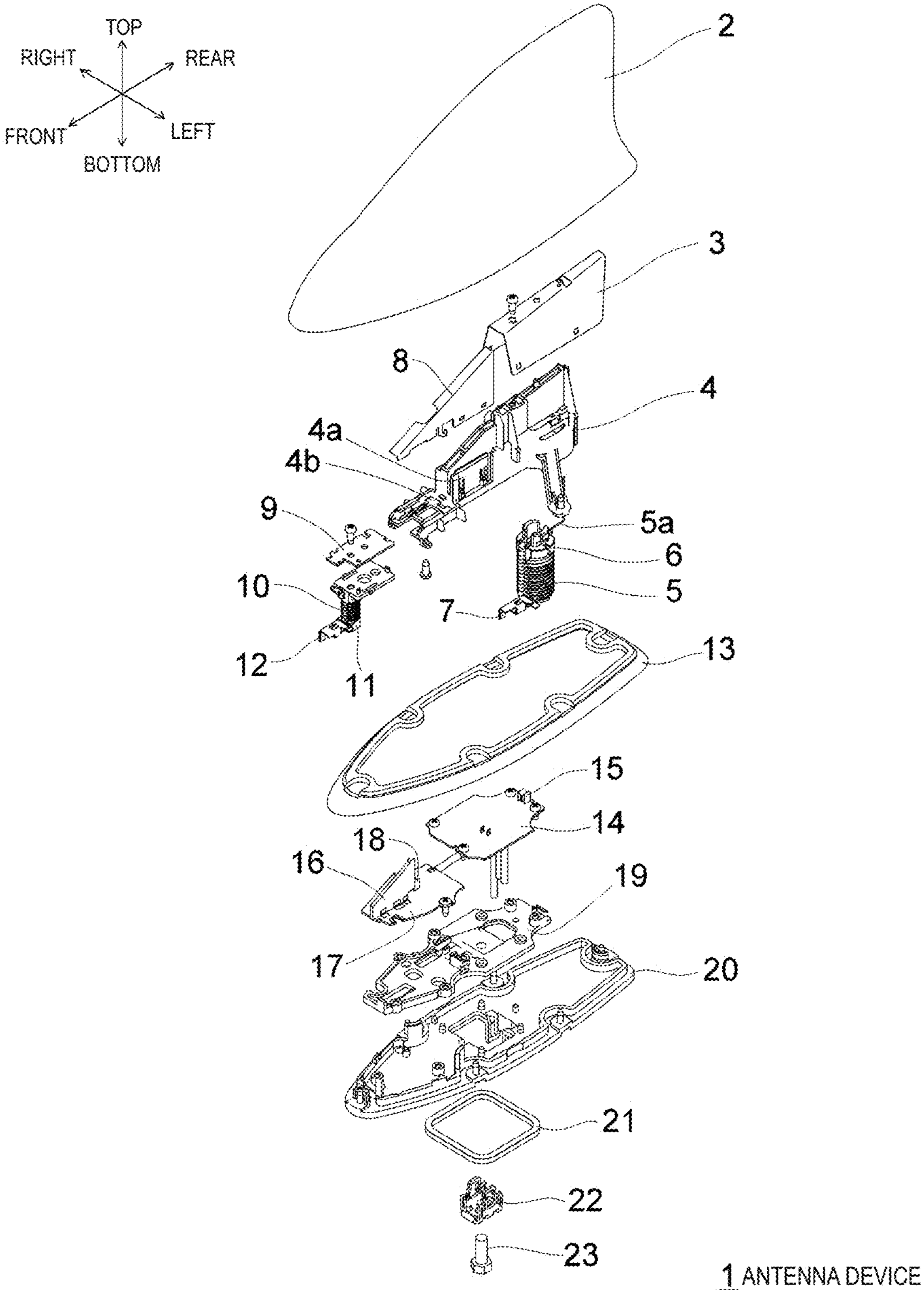
FIG. 3 is an exploded perspective view of the antenna device 1.

FIG. 1 is a perspective view of an antenna device 1 according to a first embodiment of the invention with an outer case 2 omitted. FIG. 2 is a left side view of the same. FIG. 3 is an exploded perspective view of the antenna device 1. The front-rear, top-bottom, and left-right directions, perpendicular to each other, of the antenna device 1 are defined as shown in FIGS. 1 and 3. The top-bottom is the direction that is perpendicular to a metal base 19 and a resin base 20. The bottom direction is the direction the destination side of which is the side where what the metal base 19 and the resin base 20 are to be attached (e.g., a vehicle) is to exist. The front-rear direction is the longitudinal direction of the antenna device 1. The left-right direction is the width direction of the antenna device 1. The front direction is an advancement direction of a vehicle when the antenna device 1 is attached to it. The left and right directions are defined in a state that the front side of the antenna device 1 directed to the advancement direction.

The antenna device 1 is a vehicular shark fin antenna and is attached to, for example, the roof of a vehicle. The antenna device 1 is equipped with, inside the outer case 2, an AM/FM capacitance loading element 3 and an AM/FM helical element 5 which form a first antenna together, a band III capacitance loading element 8 and a band III helical element 10 which form a second antenna together, and an L-band element 16 which forms a third antenna. The antenna device 1 may also be equipped with a GPS (Global Positioning System) device, an SXM (Sirius XM, satellite radio broadcast) antenna, etc.

The AM frequency band is 522 kHz to 1,710 kHz and the FM frequency band is 76 MHz to 108 MHz. The first antenna is configured to at least one of receive and transmit a signal in a first resonance frequency band (a first frequency band). In the embodiment, the first antenna is configured to receive a signal in the AM band and the FM band which is the first resonance frequency band (the first frequency band). The DAB has an L-band frequency band of 1,452 MHz to 1,492 MHz and a band III frequency band of 174 MHz to 240 MHz. The second antenna is configured to at least one of receive and transmit a signal in a second resonance frequency band (a second frequency band), and the third antenna is configured to at least one of receive and transmit a signal in a third resonance frequency band (a third frequency band). In the embodiment, the second antenna is configured to receive a signal in the band III frequency band which is the second resonance frequency band (the second frequency band), and the third antenna is configured to receive a signal in the L-band frequency band which is the third resonance frequency band (the third frequency band).

The outer case 2 is made of a radio-wave-transmissive synthetic resin (a mold of a resin such as PC, PET, or an ABS resin) and is shark-fin-shaped, that is, both its side surfaces are curved inward. A base which forms an internal space for housing the individual elements together with the outer case 2 is a combination of the metal base 19 and the resin base 20. The metal base 19 has a smaller area than the resin base 20 and is attached (fixed) to the resin base 20 by screwing, for example. The resin base 20 is attached (fixed) to the outer case 2 by screwing, for example. A pad 13 is a ring-shaped elastic member made of elastomer, rubber, or the like, is held between (pressed against) the outer case 2 and the resin base 20 along its entire circumference, and thereby attains water-tight sealing between the outer case 2 and the resin base 20. A sealing member 21 is a ring-shaped elastic member made of elastomer, urethane, rubber, or the like, is held between the bottom surface of the resin base 20 and a vehicle body (e.g., vehicle roof) to which the antenna device 1 is to be attached, and thereby attains water-tight sealing between them. A bolt (vehicle body attaching screw) 23 made of a conductor is threadedly engaged with the metal base 19 via a capture fastener 22 made of a conductor, and thereby fixes the antenna device 1 to, for example, the roof of the vehicle. The metal base 19 and the roof of the vehicle, for example, are electrically connected to each other via the capture fastener 22 and the bolt 23.

A holder 4, is made of a radio-wave-transmissive synthetic resin (a mold of a resin such as PC, PET, or an ABS resin), and is attached (fixed) to the inner surface of the outer case 2 by screwing, for example. The AM/FM capacitance loading element 3 which forms a first capacitance loading element is attached (fixed) to the holder 4 by screwing, for example. A band III element holding portion **4*a* of the holder 4 holds the band III capacitance loading element 8 which forms a second capacitance loading element, and a band III board holding portion 4*b* of the holder 4 holds a band III board 9**.

The AM/FM capacitance loading element 3 is a plate-like component formed by working a tin-plated steel plate (conductor plate), for example. The AM/FM helical element 5 is a lead wire that is wound on an AM/FM helical element holder 6. The AM/FM helical element holder 6 is attached (fixed) to the holder 4 by snap fitting, for example. A top terminal portion **5*a* of the AM/FM helical element 5 is electrically connected to the AM/FM capacitance loading element 3 by soldering, for example. An AM/FM connection metal fitting 7 is attached to a bottom-front portion of the AM/FM helical element holder 6. A bottom terminal portion of the AM/FM helical element 5 is electrically connected to the AM/FM connection metal fitting 7 by being wound on and soldered thereto or by being crimped thereto. The AM/FM connection metal fitting 7 is engaged with and held by an AM/FM conductor leaf spring 15 (or held between AM/FM conductor leaf springs 15). The AM/FM conductor leaf spring 15 is provided on an AM/FM amplifier board 14. The AM/FM amplifier board 14 is attached (fixed) to the metal base 19 by screwing, for example, and is substantially parallel with the metal base 19. The AM/FM capacitance loading element 3 and the AM/FM helical element 5 are configured so as to resonate as a whole in the FM frequency band, and the contact point of the AM/FM connection metal fitting 7 and the AM/FM conductor leaf spring 15 serves as a feeding point. At the feeding point, the coupling between the AM/FM capacitance loading element 3 and the band III capacitance loading element 8 is weakened by setting the impedance in the band III frequency band high by increasing the inductance (the number of winding) of the AM/FM helical element 5. Thus, an average gain in the band III frequency band can be secured even if the AM/FM capacitance loading element 3 and the band III capacitance loading element 8** are located close to each other.

Figure 25:
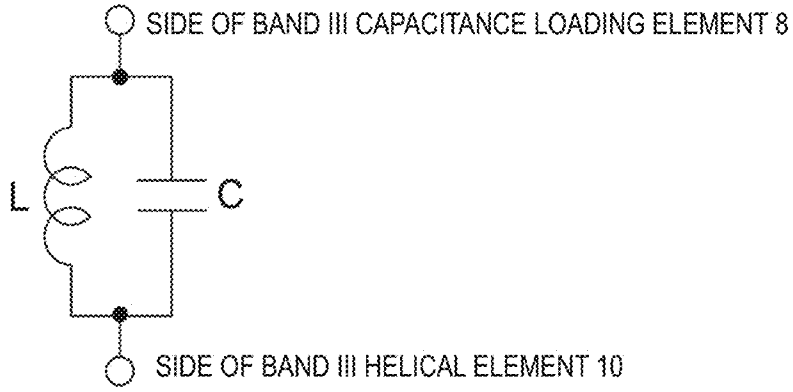
FIG. 25 is a circuit diagram of an LC parallel circuit that connects the band III capacitance loading element 8 and the band III helical element 10.
Figure 26:
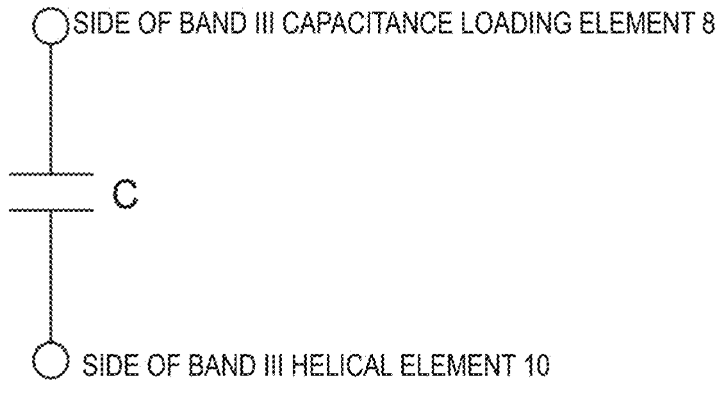
FIG. 26 is a circuit diagram of a capacitor C that connects the band III capacitance loading element 8 and the band III helical element 10.

The band III capacitance loading element 8 is soldered to the band III board 9. The band III capacitance loading element 8 is made of a metal such as a tin-plated steel plate. Since the band III capacitance loading element 8 is made of a metal sheet, the band III capacitance loading element 8 is higher in productivity and lower in cost than in a case that it is formed by a conductor pattern on a board as in Patent document 1. The band III board 9 is provided with an LC circuit in which a capacitor C and a coil L are connected in parallel as shown in FIG. 25, or with a capacitor C as shown in FIG. 26. The LC circuit shown in FIG. 25 serves as a filter that stops a signal in the FM frequency band, and the capacitor C shown in FIG. 26 serves as a filter that stops a signal in the AM/FM frequency band, and thereby weakens the coupling between the AM/FM capacitance loading element 3 and the band III capacitance loading element 8. The band III helical element 10 is a lead wire that is wound on a band III helical element holder 11. The band III helical element holder 11 is screwed to the bottom surface of the band III board 9. The band III helical element 10 is disposed on the bottom surface of the band III capacitance loading element 8 at a substantially center thereof in the left-right direction. With this structure, the band III helical element 10 is disposed at a substantially center of a design of the outer case 2 and hence the design of the outer case 2 can be made thin. A top terminal portion of the band III helical element 10 is wound on and soldered to the band III board 9 and is electrically connected to the LC circuit (see FIG. 25) or the capacitor C (see FIG. 26) which are provided on the band III board 9. A band III connection metal fitting 12 is attached to a bottom-front portion of the band III helical element holder 11. Since band III connection metal fitting 12 is attached to the bottom-front portion of the band III helical element holder 11, a large space can be formed between the AM/FM helical element 5 and the band III helical element 10, whereby the coupling between the AM/FM helical element 5 and the band III helical element 10 can be weakened further and they can be prevented from being deteriorated in performance. A bottom end portion of the band III helical element 10 is electrically connected to the band III connection metal fitting 12 by being wound and soldered thereto or by being crimped thereto. The band III connection metal fitting 12 is engaged with and held by a band III conductor leaf spring 18 (or held between leaf springs 18). The band III conductor leaf spring 18 is provided on a DAB amplifier board 17. The DAB amplifier board 17 is attached (fixed) to the metal base 19 by screwing, for example, and is substantially parallel with the metal base 19. The band III capacitance loading element 8, the band III helical element 10, and the LC circuit shown in FIG. 25 or the capacitor C shown in FIG. 26 are configured so as to resonate as a whole in the band III frequency band, and the contact point of the band III connection metal fitting 12 and the band III conductor leaf spring 18 serves as a feeding point. Since the LC circuit shown in FIG. 25 or the capacitor C shown in FIG. 26 is provided, an average gain in the AM/FM frequency band can be secured even if the AM/FM capacitance loading element 3 and the band III capacitance loading element 8 are set so close to each other as to have an interval of 10 mm or less, for example.

An axial direction of the AM/FM helical element 5 and an axial direction of the Band III helical element 10 are substantially parallel to each other. By this structure, in compared with a case that the axial direction of the AM/FM helical element 5 and the axial direction of the Band III helical element 10 are not parallel to each other, the production can be easier, and it is possible to make a distance between the AM/FM helical element 5 and the Band III helical element 10 larger so as to suppress an interference between the AM/FM helical element 5 and the Band III helical element 10. Further, the axial direction of the AM/FM helical element 5 and the axial direction of the Band III helical element 10 are substantially perpendicular to at least one of the metal base 19 and the resin base 20. By this structure, in compared with a case that the axial direction of the AM/FM helical element 5 and the axial direction of the Band III helical element 10 are not perpendicular to at least one of the metal base 19 and the resin base 20, a face of the AM/FM helical element 5 opposing to at least one of the metal base 19 and the resin base 20 and a face of the Band III helical element 10 opposing to at least one of the metal base 19 and the resin base 20 can be smaller, so as to suppress interferences therebetween respectively. And, by this structure, in compared with the case that the axial direction of the AM/FM helical element 5 and the axial direction of the Band III helical element 10 are not perpendicular to at least one of the metal base 19 and the resin base 20, it is possible to improve the reception performance for such a signal in the Band III frequency band which is often a vertically polarized signal and such a signal in the AM/FM frequency band which is a vertically polarized signal and a horizontally polarized signal. And, a distance between an axis of the AM/FM helical element 5 and an axis of the Band III helical element 10 in the front-rear direction is larger than a distance between the AM/FM capacitance loading element 3 and the Band III capacitance loading element 8 in the front-rear direction. By this structure, in compared with a case that the distance between the axis of the AM/FM helical element 5 and the axis of the Band III helical element 10 in the front-rear direction is not larger than the distance between the AM/FM capacitance loading element 3 and the Band III capacitance loading element 8 in the front-rear direction, it is possible to make the distance between the AM/FM helical element 5 and the Band III helical element 10 larger so as to suppress the interference between the AM/FM helical element 5 and the Band III helical element 10.

A diameter of a coil of the AM/FM helical element 5 is different from a diameter of a coil of the Band III helical element 10. The diameter of the coil of the Band III helical element 10 is smaller than the diameter of the coil of the AM/FM helical element 5. By this structure, in compared with a case that the diameter of the coil of the Band III helical element 10 is the same as the diameter of the coil of the AM/FM helical element 5, it is possible to make the distance between the AM/FM helical element 5 and the Band III helical element 10 larger so as to suppress the interference between the AM/FM helical element 5 and the Band III helical element 10. And, by this structure, in compared with the case that the diameter of the coil of the AM/FM helical element 5 is the same as the diameter of the coil of the Band III helical element 10, the height of the AM/FM helical element 5 can be lowered. Also, a round direction of the AM/FM helical element 5 is the same as a round direction of the Band III helical element 10. By this structure, the production can be easier.

A feeding point (a first feeding point) for the AM/FM capacitance loading element 3 and the AM/FM helical element 5 is disposed at a front side of the AM/FM capacitance loading element 3 in the front-rear direction. A feeding point (a second feeding point) for the Band III capacitance loading element 8 and the Band III helical element 10 is disposed at a front side of the Band III capacitance loading element 8 in the front-rear direction. By this structure, in compared with a case that the first feeding point is disposed at a front side of the AM/FM capacitance loading element 3 and the second feeding point is disposed at a rear side of the Band III capacitance loading element 8, it is possible to make the distance between the AM/FM helical element 5 and the Band III helical element 10 larger so as to suppress the interference between the AM/FM helical element 5 and the Band III helical element 10. And, the AM/FM amplifier board 14 (a first board) and the DAB amplifier board 7 (a second board) are separated members from each other, the AM/FM amplifier board 14 includes the first feeding point and the DAB amplifier board 7 includes the second feeding point. By this structure, in compared with a case that the AM/FM amplifier board 14 and the DAB amplifier board 7 are formed as a single board, it is possible to suppress an effect by a noise of one of the AM/FM amplifier board 14 and the DAB amplifier board 7 to the other. Further, for a model of the antennal device which does not need the DAB for example, extra portions of the boards can be omitted so as to reduce a cost.

The AM/FM amplifier board 14 is opposed to the Band III capacitance loading element 8. Thus, when viewed in the top-bottom direction, the AM/FM amplifier board 14 overlaps with the Band III capacitance loading element 8. By this structure, in compared with a case that the AM/FM amplifier board 14 is not opposed to the Band III capacitance loading element 8 and is opposed to only the AM/FM capacitance loading element 3, it is possible to suppress an interference in the AM/FM capacitance loading element 3 caused by a noise of the amplifier of the AM/FM amplifier board 14.

Figure 4:
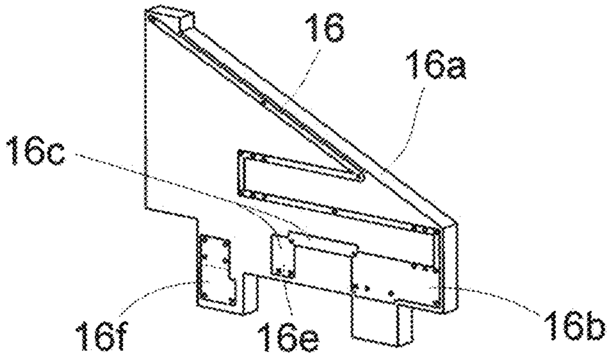
FIG. 4 is a perspective view, as viewed from the front-right side, of an L-band element 16 shown in FIG. 3.
Figure 5:
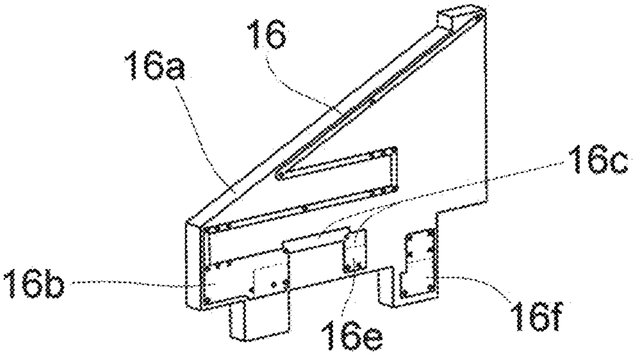
FIG. 5 is a perspective view, as viewed from the front-left side, of the same.

An L-band element 16 is provided on the DAB amplifier board 17. Although not shown in FIGS. 1-3, the L-band element 16 is conductor patterns that are printed (formed) on the two respective surfaces of a board **16*a* as shown in FIGS. 4 and 5. The L-band element 16 and the conductor patterns on one surface and the other surface of the board 16*a* are electrically connected to each other through through-holes. Conductor patterns 16*b* which are portions of the L-band element 16 are a feeding point of an L-band antenna, are provided at a bottom end position of the L-band element 16, and are electrically connected to the DAB amplifier board 17 by soldering, for example. Conductor patterns 16*c*, which are portions of the L-band element 16 are provided for adjusting the impedance. Connection portions 16*e* which are portions of the conductor patterns 16*c* respectively are electrically connected to the ground of the DAB amplifier board 17 by soldering, for example. The conductor patterns 16***c* may be omitted. Conductor patterns 16*f*, which are printed on the two respective surfaces of the board 16*a* separately from the L-band element 16, serve to fix the board 16*a* to the DAB amplifier board 17, are not connected to the L-band element 16, and are fixed to the DAB amplifier board 17 by soldering, for example. The board 16*a* is fixed to the top surface of the DAB amplifier board 17 at a substantially center thereof in the left-right direction by soldering of the conductor patterns 16*b*, 16*e*, and 16*f* to the DAB amplifier board 17, and is disposed perpendicularly to the DAB amplifier board 17, that is, to the metal base 19. With this structure, the L-band element 16 is disposed at such a position as to be left-right symmetrical with respect to the metal base 19 and hence the directivity is made substantially isotropic and suitable for reception performance. Furthermore, since the L-band element 16 is disposed at the substantially center of the design of the outer case 2 so as to have a necessary height, the design of the case can be made thin without lowering the gain.

To increase the average gain in the L-band frequency band, it is desirable that at least one of a harmonic frequency of the AM/FM capacitance loading element 3 and the AM/FM helical element 5 and a harmonic frequency of the band III capacitance loading element 8 and the band III helical element 10 do not exist in the L-band frequency band.

(Shape of Band III Capacitance Loading Element 8)

Figure 6:
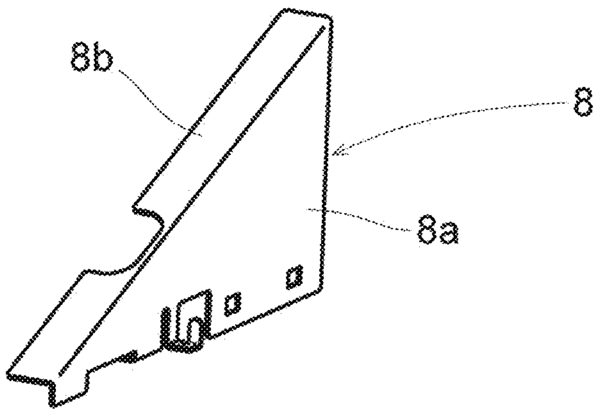
FIG. 6 is a perspective view, as viewed from the front-left side, of a band III capacitance loading element 8 shown in FIG. 3.
Figure 7:
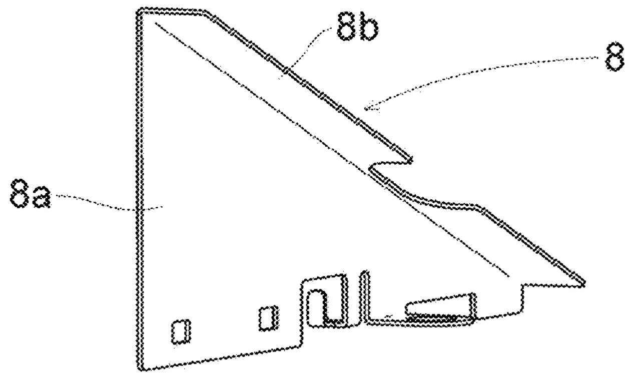
FIG. 7 is a perspective view, as viewed from the rear-right side, of the same.

FIG. 6 is a perspective view, as viewed from the front-left side, of the band III capacitance loading element 8 shown in FIG. 3. FIG. 7 is a perspective view, as viewed from the rear-right side, of the same. The band III capacitance loading element 8 is preferably made from a single metal sheet component and is disposed above the metal base 19. The band III capacitance loading element 8 includes a side portion 8*a* as a first portion and a top portion 8*b* as a second portion. It is preferable that the side portion 8*a* is a flat plate perpendicular to the metal base 19 and is not parallel with left and right side surfaces of the AM/FM capacitance loading element 3. Since the side portion 8*a* is not parallel with the left and right side surfaces of the AM/FM capacitance loading element 3, the coupling between band III capacitance loading element 8 and the AM/FM capacitance loading element 3 can be made weaker than in a case that the side portion 8*a* is parallel with the left and right side surfaces of the AM/FM capacitance loading element 3 if a distance in the front-rear direction between the side portion 8*a* and the left and right side surfaces of the AM/FM capacitance loading element 3 is the same. It is preferable that the side portion 8*a* has a shape such that its height from the metal base 19 increases from the front side thereof toward the rear side thereof, and the shape is a triangle, for example. The top portion 8*b* is a flat plate that is opposed to the AM/FM amplifier board 14 (opposed to the metal base 19 and the resin base 20), and is a portion that is bent (folded) from the top edge of the side portion 8*a* (the opposite side to the metal base 19). The top edge of the side portion 8*a* (the edge at the opposite side to the metal base 19) and the left edge of the top portion 8*b* adjoin each other. The top portion 8*b* forms a smaller angle with the metal base 19 than the side portion 8*a* does. The right edge of the top portion 8*b* is an outer edge of the band III capacitance loading element 8. The height of the band III capacitance loading element 8 is smaller than or equal to 70 mm, for example, and the left-right width of the top portion 8*b* is 2 to 15 mm, for example. The dimensions and the shape of the band III capacitance loading element 8 are set so that its capacitance value becomes 2 to 4 pF.

Figure 8:
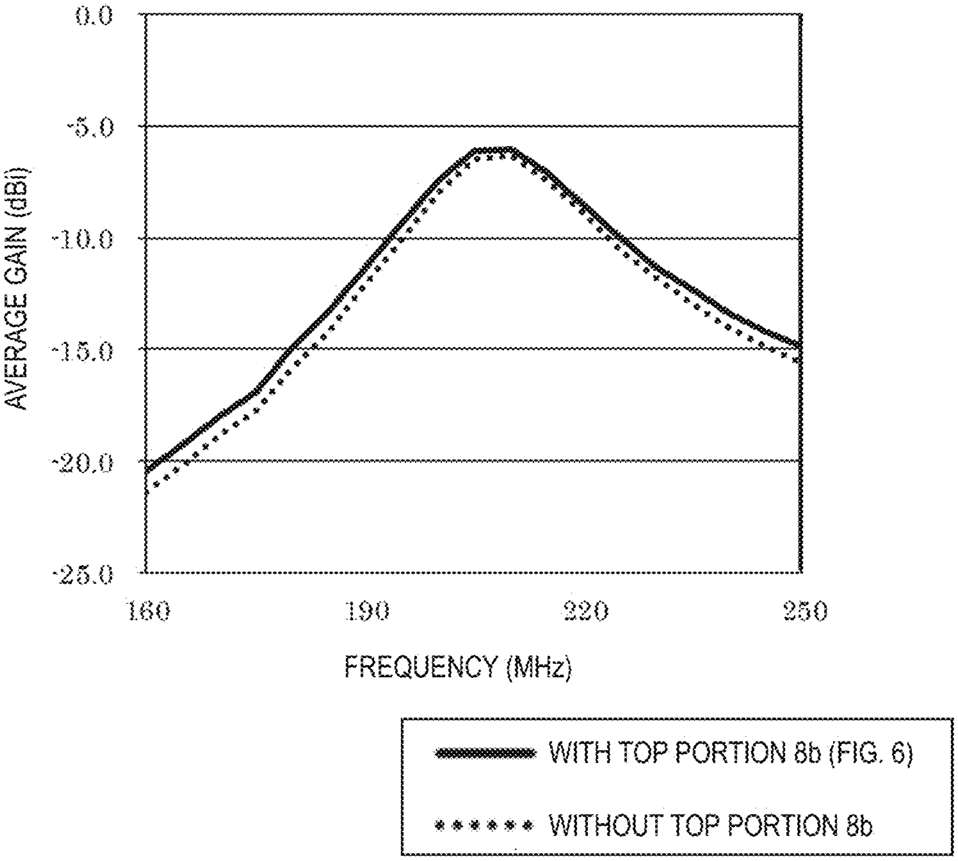
FIG. 8 is a characteristic diagram produced by a simulation and showing a relationship between the frequency and the average gain in a band III frequency band of each of the antenna device 1 in which a band III capacitance loading element 8 has a top portion **8*b* and an antenna device in which the band III capacitance loading element 8 does not have the top portion 8*b***.

FIG. 8 is a characteristic diagram produced by a simulation and showing a relationship between the frequency and the average gain in the band III frequency band of each of the antenna device 1 in which the band III capacitance loading element 8 has the top portion 8*b* and an antenna device in which the band III capacitance loading element 8 does not have the top portion 8*b*. As shown in FIG. 8, since the band III capacitance loading element 8 has the top portion 8*b*, the antenna device 1 is larger in the area of the band III capacitance loading element 8 and hence larger in the average gain in the band III frequency band so as to expand the band than the antenna device whose band III capacitance loading element 8 does not have the top portion 8*b*. The antenna device 1 can be lower in the height than the antenna device whose top portion 8*b* is disposed in the flat plate perpendicular to the metal base 19 as with the side portion 8*a*. The AM/FM capacitance loading element 3 includes the top portion as with the Band III capacitance loading element 8, thus, the same effect as that obtained by the Band III capacitance loading element 8 having the top portion 8*b* can be obtained.

Figure 9:
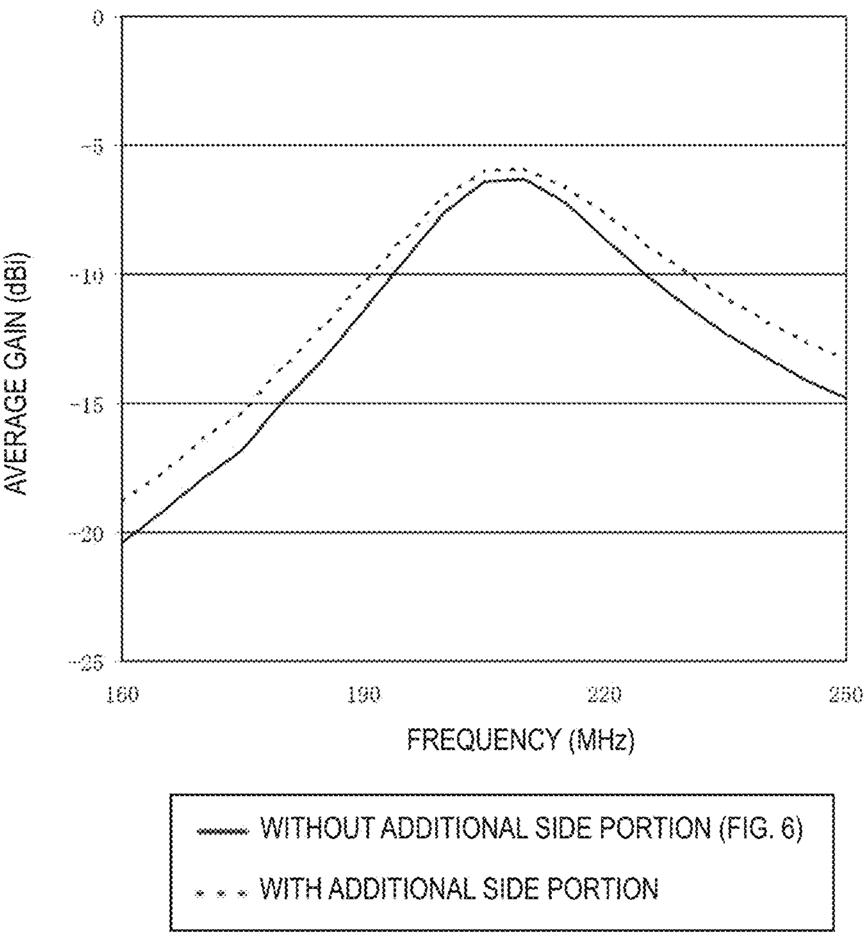
FIG. 9 is a characteristic diagram produced by a simulation and showing a relationship between the frequency and the average gain in the band III frequency band of each of an antenna device in which the band III capacitance loading element 8 has an additional side portion that is disposed to the metal base 19 and is connected to a side of the top portion **8*b* opposite to a side of the top portion 8*b* to which the side portion 8*a* is connected, and the antenna device 1** having no such additional side portion.

FIG. 9 is a characteristic diagram produced by a simulation and showing a relationship between the frequency and the average gain in the band III frequency band of each of an antenna device in which the band III capacitance loading element 8 has an additional side portion that is disposed to the metal base 19 and is connected to the top portion 8*b* from the opposite side to the side portion 8*a* and the antenna device 1 having no such additional side portion. As shown in FIG. 9, the antenna device whose band III capacitance loading element 8 has the additional side portion is larger in the average gain in the band III frequency band than the antenna device 1 whose band III capacitance loading element 8 does not have the additional side portion. This is because the area of the band III capacitance loading element 8 is increased by providing the additional side portion. The band III capacitance loading element 8 may have any shape as long as design conditions such as the capacitance are satisfied.

Figure 10:
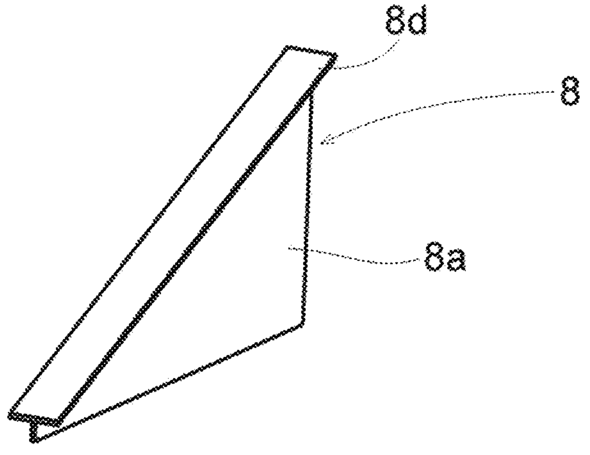
FIG. 10 is a perspective view showing a band III capacitance loading element 8 of a first modification.

FIG. 10 is a perspective view showing a band III capacitance loading element 8 of a first modification. The band III capacitance loading element 8 of this modification is obtained by replacing the top portion 8*b* shown in FIG. 6 with a top portion 8*d*. The top portion 8*d* is different from the top portion 8*b* in that the former is connected to the side portion 8*a* at its middle portion (at the center in the illustrate example) in the left-right direction, and is the same as the top portion 8*b* in the other points.

Figure 11:
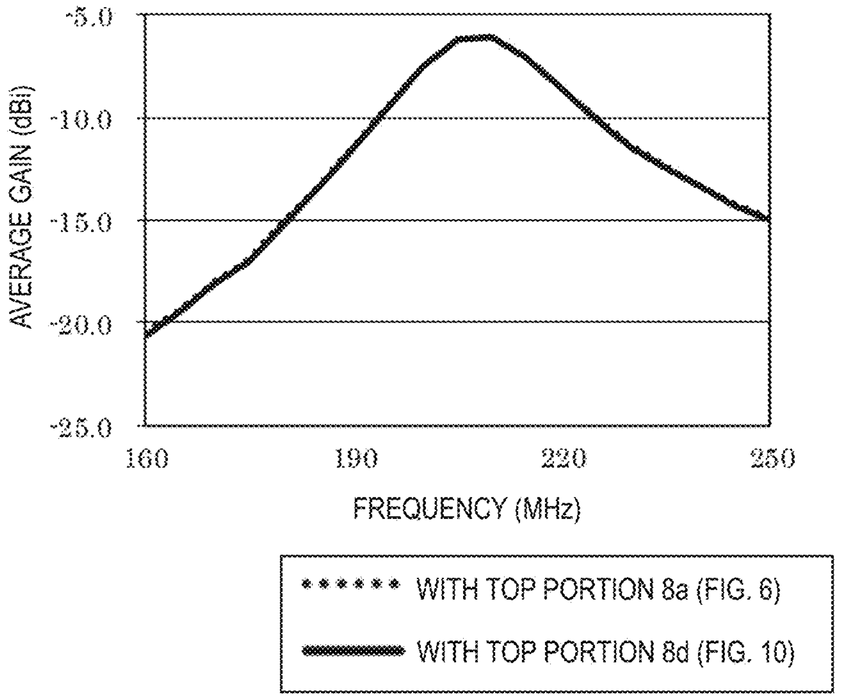
FIG. 11 is a characteristic diagram produced by a simulation and showing a relationship between the frequency and the average gain in the band III frequency band of each of the antenna device 1 (FIG. 6) in which the band III capacitance loading element 8 has the top portion **8*b* and the antenna device (FIG. 10) in which the band III capacitance loading element 8 has a top portion 8*d***.

FIG. 11 is a characteristic diagram produced by a simulation and showing a relationship between the frequency and the average gain in the band III frequency band of each of the antenna device 1 (FIG. 6) in which the band III capacitance loading element 8 has the top portion 8*b* and the antenna device (FIG. 10) in which the band III capacitance loading element 8 has the top portion 8*d*. As shown in FIG. 11, the case that band III capacitance loading element 8 has the top portion 8*b* and the case the band III capacitance loading element 8 has the top portion 8*d* have almost no differences in the average gain in the band III frequency band.

Figure 12:
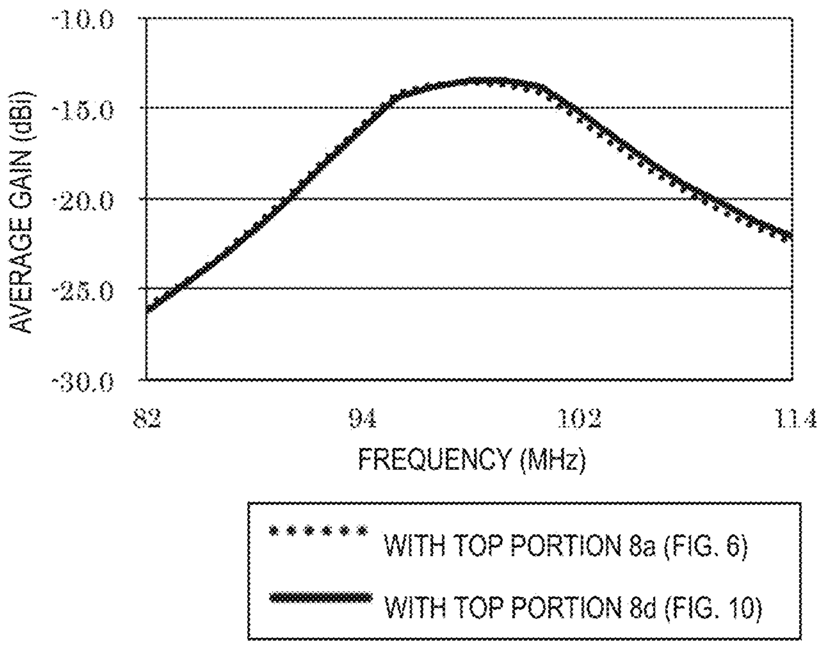
FIG. 12 is a characteristic diagram produced by a simulation and showing a relationship between the frequency and the average gain in an FM band of each of the same antenna devices 1 as FIG. 11 is concerned about.

FIG. 12 is a characteristic diagram produced by a simulation and showing a relationship between the frequency and the average gain in the FM band of the antenna device 1 in each of the same cases as FIG. 11. This diagram shows results in an FM frequency band 88 MHz to 108 MHz which is employed in countries other than Japan. As shown in FIG. 12, the case that band III capacitance loading element 8 has the top portion **8*b* and the case the band III capacitance loading element 8 has the top portion 8*d*** have almost no differences in the average gain in the FM frequency band.

Comparing the band III capacitance loading elements 8 shown in FIGS. 6 and 10, the one shown in FIG. 6 can be formed by bending a single metal plate. Thus, the band III capacitance loading element 8 shown in FIG. 6 is superior to that shown in FIG. 10 from the viewpoint of productivity.

Figure 13:
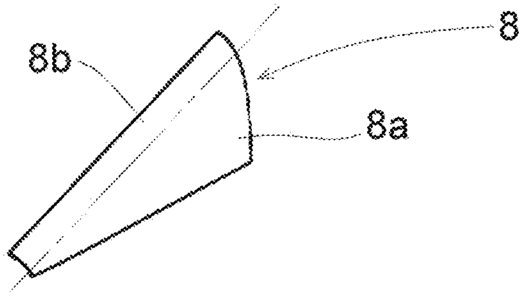
FIG. 13 is a perspective view, as viewed from the left-front side, of a band III capacitance loading element 8 of a second modification.
Figure 14:
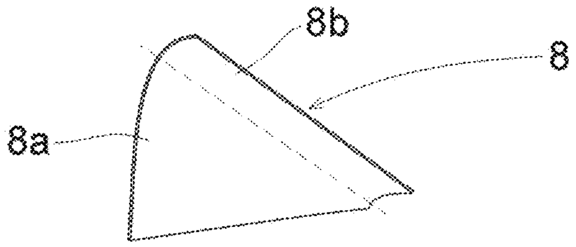
FIG. 14 is a perspective view, as viewed from the rear-right side, of the same.

FIG. 13 is a perspective view, as viewed from the left-front side, of a band III capacitance loading element 8 of a second modification. FIG. 14 is a perspective view, as viewed from the rear-right side, of the same. As shown in these figures, the band III capacitance loading element 8 may be shaped so as to be curved partially or totally so that the angle with respect to the metal base 19 decreases as the position goes up.

(Front-Rear Positional Relationships Among L-Band, Band III, and AM/FM)

As shown in FIGS. 1-3, the L-band element 16, the band III capacitance loading element 8, and the AM/FM capacitance loading element 3 are arranged in this order from the front side to the rear side of the antenna device 1. Since the frequency decreases in the order of the L-band frequency band, the band III frequency band, and the AM/FM frequency band, the length (height) increases in the order of the L-band element 16, the band III capacitance loading element 8, and the AM/FM capacitance loading element 3. That is, the band III capacitance loading element 8 needs to be longer than the L-band element 16, and the AM/FM capacitance loading element 3 needs to be longer than the band III capacitance loading element 8. Thus, by arranging the L-band element 16, the band III capacitance loading element 8, and the AM/FM capacitance loading element 3 in this order from the front side as shown in FIGS. 1-3, increase of the top-bottom height of the outer case 2 which is shaped so as to increase in height from the front side to the rear side can be suppressed than in cases that they are arranged in different order from the front side. Furthermore, since the inductance required for resonance (the area required for producing the inductance) increases in the order of the L-band element 16, the band III capacitance loading element 8, and the AM/FM capacitance loading element 3, increase of the top-bottom height of the outer case 2 can be suppressed by arranging the L-band element 16, the band III capacitance loading element 8, and the AM/FM capacitance loading element 3 in this order from the front side.

Figure 15:
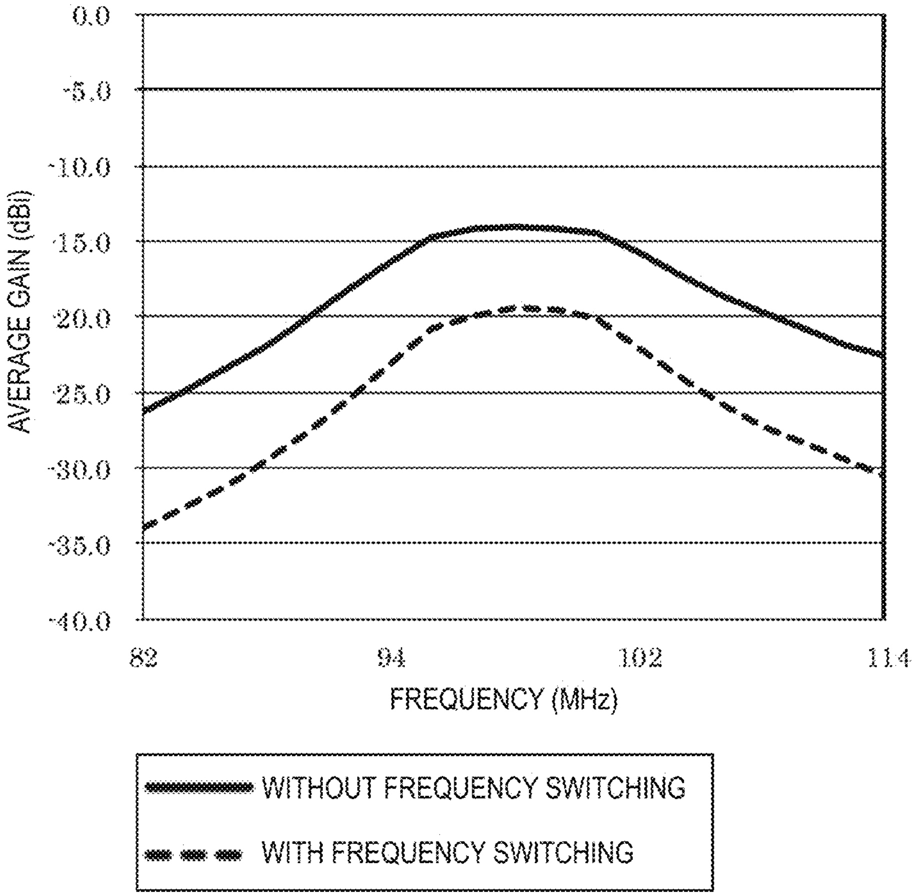
FIG. 15 is a characteristic diagram produced by a simulation and showing a relationship between the frequency and the average gain in the FM band of each of an antenna device in which frequency switching is made that the resonance frequency of the band III capacitance loading element 8 and the band III helical element 10 is set in the FM frequency band and the resonance frequency band of the AM/FM capacitance loading element 3 and the AM/FM helical element 5 is set in the band III frequency band and the antenna device 1 in which no frequency switching is made.

FIG. 15 is a characteristic diagram produced by a simulation and showing a relationship between the frequency and the average gain in the FM band of each of an antenna device in which frequency is switched such that the resonance frequency of the band III capacitance loading element 8 and the band III helical element 10 is set in the FM frequency band and the resonance frequency band of the AM/FM capacitance loading element 3 and the AM/FM helical element 5 is set in the band III frequency band and the antenna device 1 in which frequency is not switched. The frequency was switched by adjusting the inductance values of the band III helical element 10 and the AM/FM helical element 5 without changing the shapes of the band III capacitance loading element 8 and the AM/FM capacitance loading element 3. As shown in FIG. 15, the average gain decreases remarkably in the FM frequency band when the frequency is changed. This is because of decrease in the height and area of each capacitance loading element. It is therefore desirable that the band III capacitance loading element 8 and the AM/FM capacitance loading element 3 are arranged in this order from the front side. The same is true of a case that the resonance frequency band of the L-band element 16 is set in the FM frequency band or the band III frequency band. It is therefore desirable that the L-band element 16, the band III capacitance loading element 8, and the AM/FM capacitance loading element 3 are arranged in this order from the front side.

Figure 16:
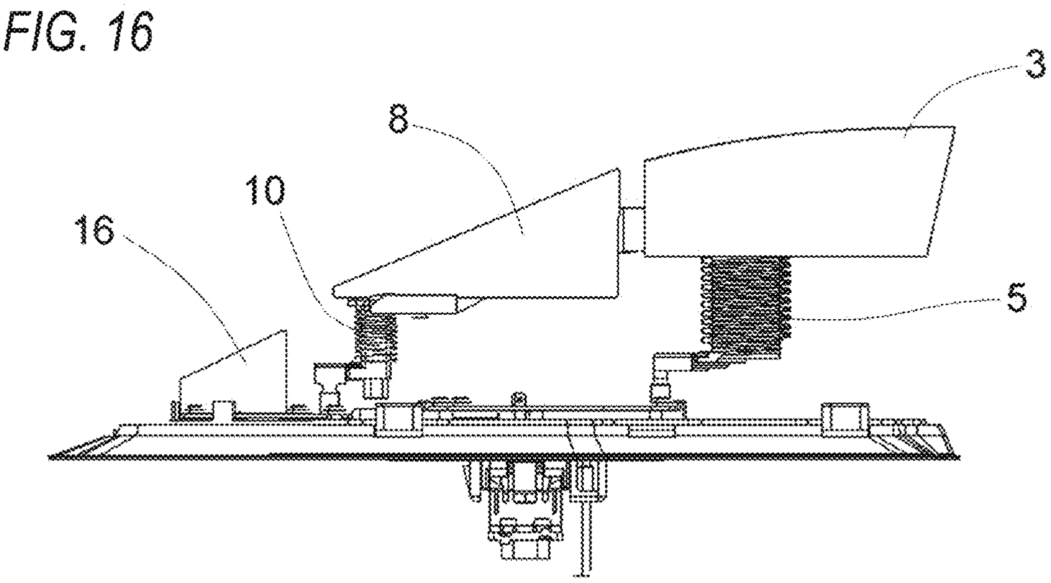
FIG. 16 is a simplified left side view of an antenna device 1 in which the band III capacitance loading element 8 and the AM/FM capacitance loading element 3 have substantially the same shapes as those shown in FIG. 2.
Figure 17:
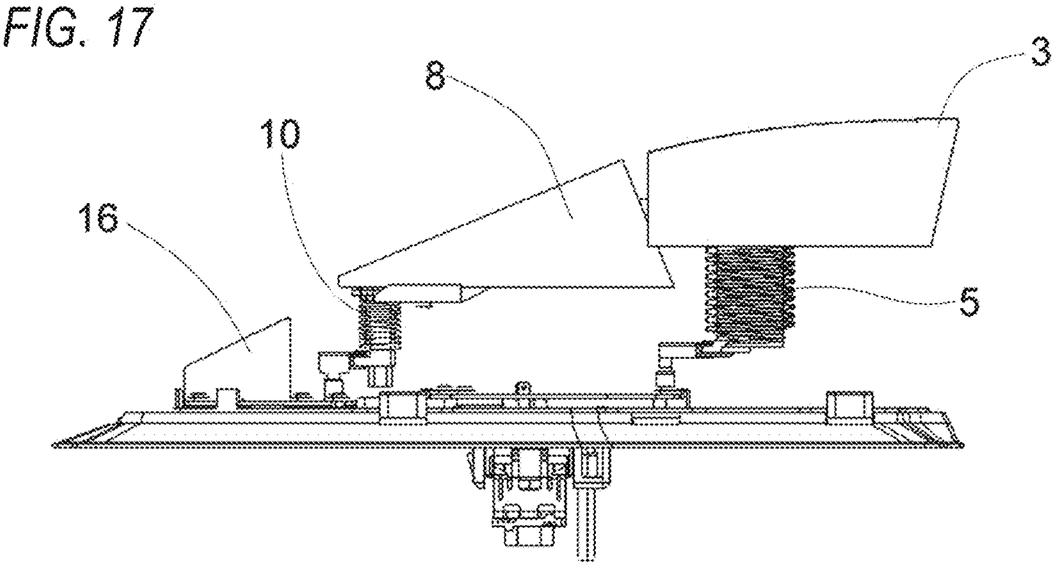
FIG. 17 is a simplified left side view of an antenna device that is different from the antenna device 1 shown in FIG. 16 in that a bottom-rear portion of the band III capacitance loading element 8 is elongated rearward so as to go into the range of presence, in the front-rear direction, of the AM/FM capacitance loading element 3.

FIG. 16 is a simplified left side view of an antenna device 1 in which the band III capacitance loading element 8 and the AM/FM capacitance loading element 3 have the substantially same shapes as those shown in FIG. 2. FIG. 17 is a simplified left side view of an antenna device that is different from the antenna device 1 shown in FIG. 16 in that a bottom-rear portion of the band III capacitance loading element 8 is elongated rearward so as to go into the range of presence, in the front-rear direction, of the AM/FM capacitance loading element 3. The rear edge of the band III capacitance loading element 8 is inclined so as to advance rearward as the position goes down. The configurations shown in FIGS. 16 and 17 are the same except for the shapes of the rear portions of the band III capacitance loading elements 8.

Figure 18:
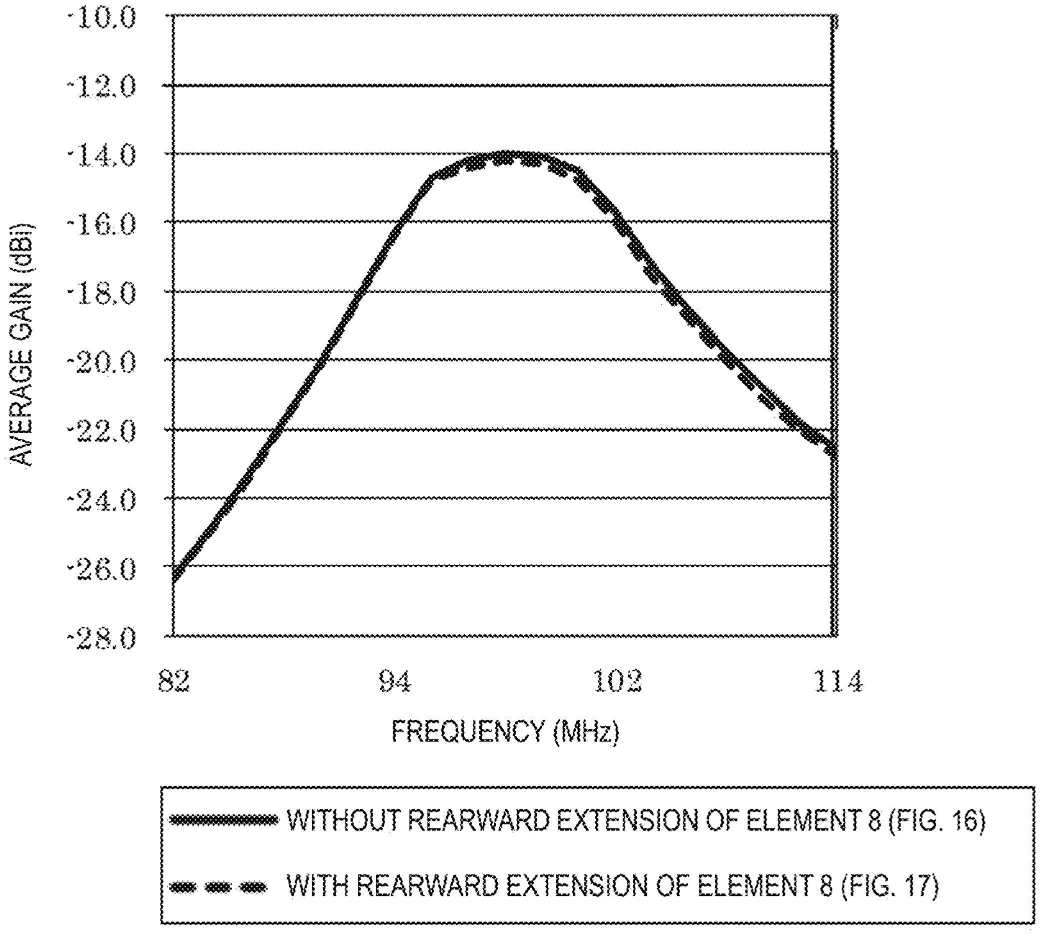
FIG. 18 is a characteristic diagram produced by a simulation and showing a relationship between the frequency and the average gain in the FM band of each of an antenna device 1 (FIG. 16) in which the ranges of presence, in the front-rear direction, of the band III capacitance loading element 8 and the AM/FM capacitance loading element 3 do not overlap with each other and an antenna device (FIG. 17) in which the ranges of presence overlap with each other.

FIG. 18 is a characteristic diagram produced by a simulation and showing a relationship between the frequency and the average gain in the FM band of each of the antenna device 1 in which the ranges of presence, in the front-rear direction, of the band III capacitance loading element 8 and the AM/FM capacitance loading element 3 do not overlap with each other (without rearward extension of the band III capacitance loading element 8 (FIG. 16)) and the antenna device in which the ranges of presence overlap with each other (with rearward extension of the band III capacitance loading element 8 (FIG. 17)). Whereas elongating the bottom-rear portion of the band III capacitance loading element 8 rearward so that it goes into the range of presence, in the front-rear direction, of the AM/FM capacitance loading element 3 has an effect of increasing the area of the band III capacitance loading element 8, it is a factor in lowering the average gain in the FM frequency band as shown in FIG. 18. It is therefore desirable that the ranges of presence, in the front-rear direction, of the AM/FM capacitance loading element 3 and the band III capacitance loading element 8 do not overlap with each other. The same is true of the L-band element 16 and the band III capacitance loading element 8. It is therefore desirable that the ranges of presence, in the L-band element 16 and the band III capacitance loading element 8 do not overlap with each other.

(Shapes of Band III Capacitance Loading Element 8 and AM/FM Capacitance Loading Element 3)

Figure 19:
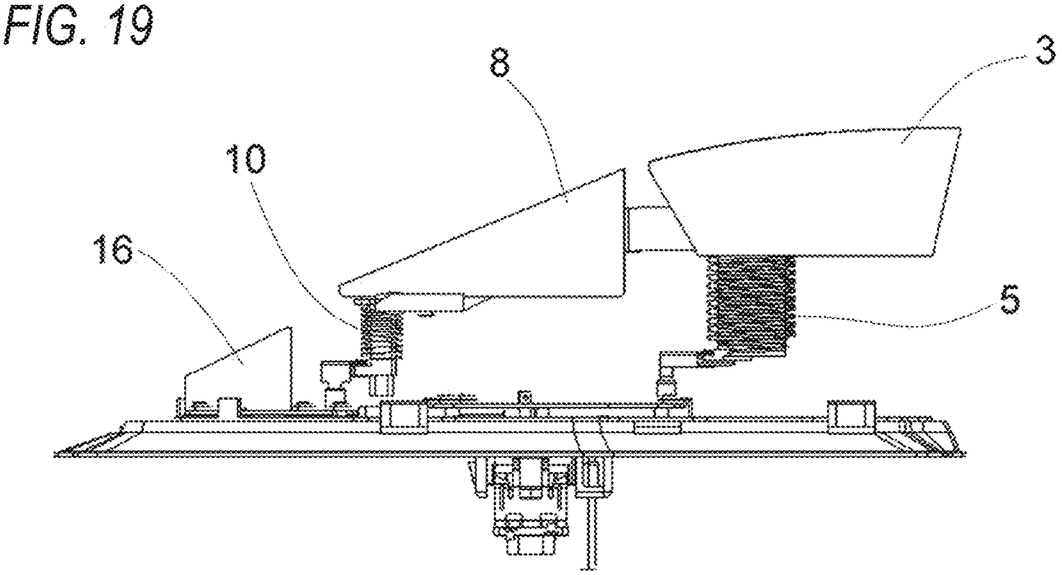
FIG. 19 is a simplified left side view of an antenna device 1 that is different from the antenna device 1 shown in FIG. 16 in that a bottom-front portion of the AM/FM capacitance loading element 3 is cut away obliquely.
Figure 20:
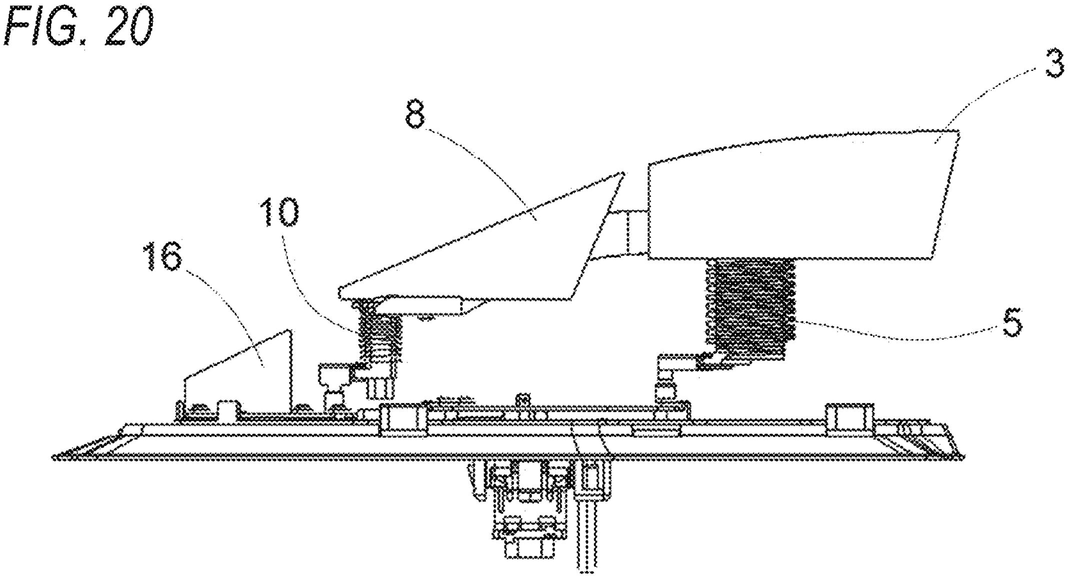
FIG. 20 is a simplified left side view of an antenna device 1 that is different from the antenna device 1 shown in FIG. 16 in that a bottom-rear portion of the band III capacitance loading element 8 is cut away obliquely.
Figure 21:
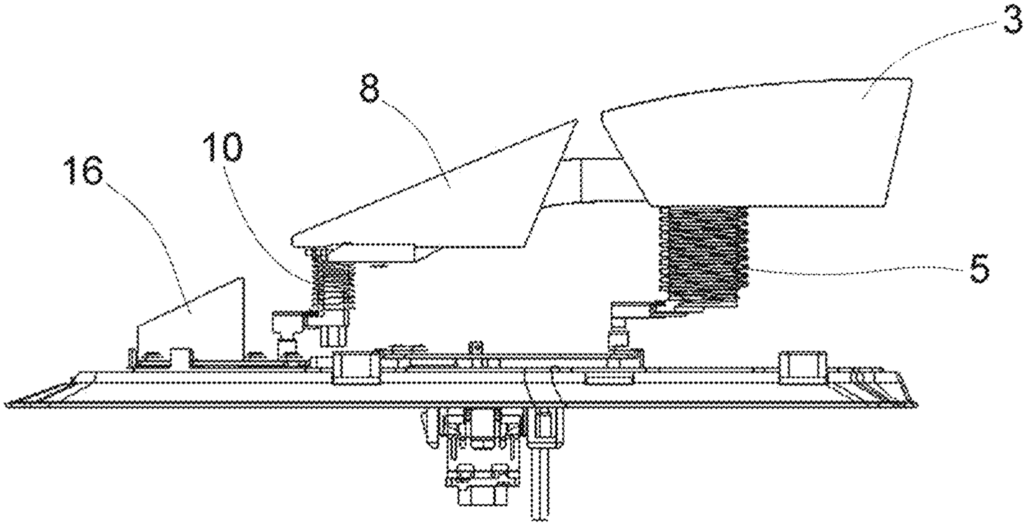
FIG. 21 is a simplified left side view of an antenna device 1 in which the AM/FM capacitance loading element 3 has the same shape as that shown in FIG. 19 and the band III capacitance loading element 8 has the same shape as that shown in FIG. 20.

FIG. 19 is a simplified left side view of an antenna device 1 that is different from the antenna device 1 shown in FIG. 16 in that a bottom-front portion of the AM/FM capacitance loading element 3 is cut away obliquely (bottom portion cutting of the AM/FM capacitance loading element 3). The oblique cutting direction in FIG. 19 is such that the front edges of the AM/FM capacitance loading element 3 recede rearward as the position goes down. Instead of the straight oblique cutting, curved cutting may be done so that the front edges become concave toward the side of the band III capacitance loading element 8 (e.g., circular arc cutting). In the following description, the expression "the edges (or edge) are curved so as to become concave toward the side of the band III capacitance loading element 8 (or the side of the AM/FM capacitance loading element 3)" means that the front edges of the AM/FM capacitance loading element 3 (or the rear edge of the band III capacitance loading element 8)

are recessed toward the opposite side to the band III capacitance loading element 8 (or the AM/FM capacitance loading element 3) with respect to the straight lines connecting the top ends and the bottom ends. Furthermore, the expression "the edges (or edge) are curved so as to become concave toward the side of the band III capacitance loading element 8 (or the side of the AM/FM capacitance loading element 3)" includes a structure that a circular arc starting from a middle position, in the top-bottom direction, of the rear edge of the band III capacitance loading element 8 (or the front edges of the AM/FM capacitance loading element 3) forms at least part of the front edges of the AM/FM capacitance loading element 3 (or the rear edge of the band III capacitance loading element 8). FIG. 20 is a simplified left side view of an antenna device 1 that is different from the antenna device 1 shown in FIG. 16 in that a bottom-rear portion of the band III capacitance loading element 8 is cut away obliquely (bottom portion cutting of the band III capacitance loading element 8). The oblique cutting direction in FIG. 20 is such that the rear edge of the band III capacitance loading element 8 advances forward as the position goes down. Instead of the straight oblique cutting, curved cutting may be done so that the rear edge become concave toward the side of the AM/FM capacitance loading element 3 (e.g., circular arc cutting). FIG. 21 is a simplified left side view of an antenna device 1 in which the AM/FM capacitance loading element 3 has the same shape as that shown in FIG. 19 and the band III capacitance loading element 8 has the same shape as that shown in FIG. 20 (bottom portion cutting of both elements).

Figure 22:
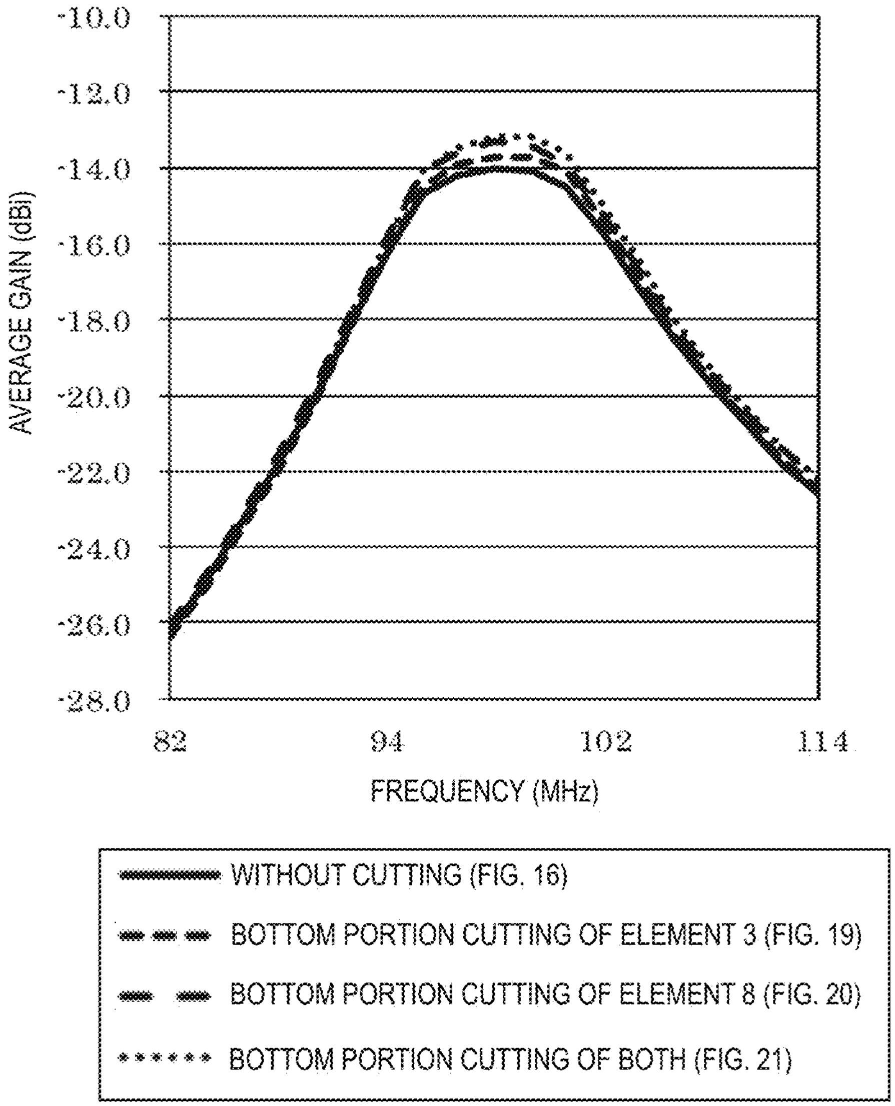
FIG. 22 is a characteristic diagram produced by a simulation and showing a relationship between the frequency and the average gain in the FM band of each of the antenna devices 1 shown in FIGS. 16 and 19-21.

FIG. 22 is a characteristic diagram produced by a simulation and showing a relationship between the frequency and the average gain in the FM band of each of the antenna devices 1 shown in FIG. 16 and FIGS. 19-21. As shown in FIG. 22, the average gain in the FM frequency band can be increased by increasing the interval, in the front-rear direction, between the bottom portion of the AM/FM capacitance loading element 3 and the bottom portion of the band III capacitance loading element 8 by cutting away at least one of a bottom-front portion of the AM/FM capacitance loading element 3 and a bottom-rear portion of the band III capacitance loading element 8. As shown in FIG. 22, the interval, in the front-rear direction, between the bottom portion of the AM/FM capacitance loading element 3 and the bottom portion of the band III capacitance loading element 8 becomes the longest when obliquely cutting away both of a bottom-front portion of the AM/FM capacitance loading element 3 and a bottom-rear portion of the band III capacitance loading element 8, whereby the average gain in the FM frequency band can be increased most.

Figure 23:
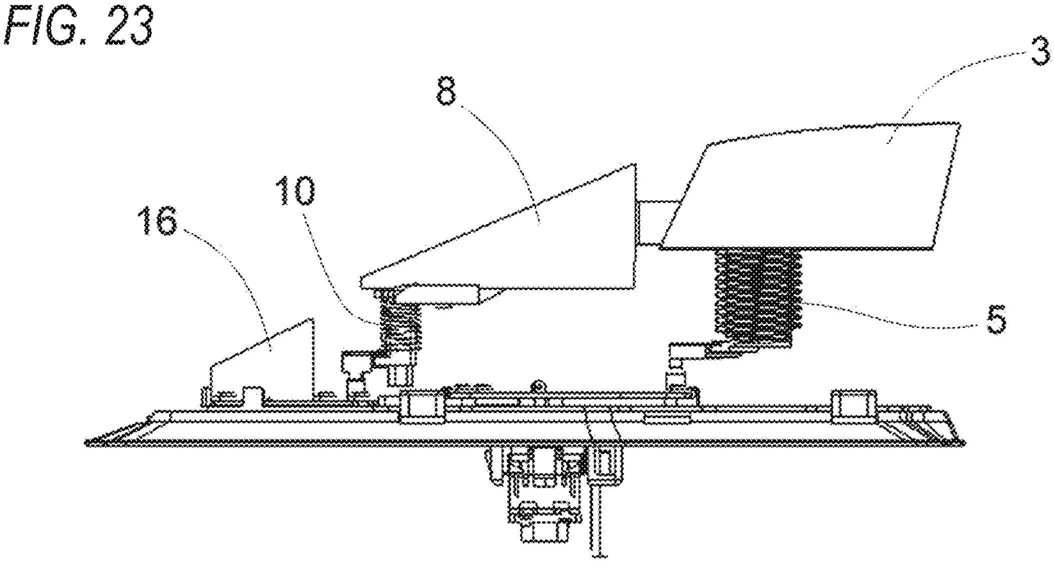
FIG. 23 is a simplified left side view of an antenna device that is different from the antenna device 1 shown in FIG. 16 in that a top-front portion of the AM/FM capacitance loading element 3 is cut away obliquely.
Figure 24:
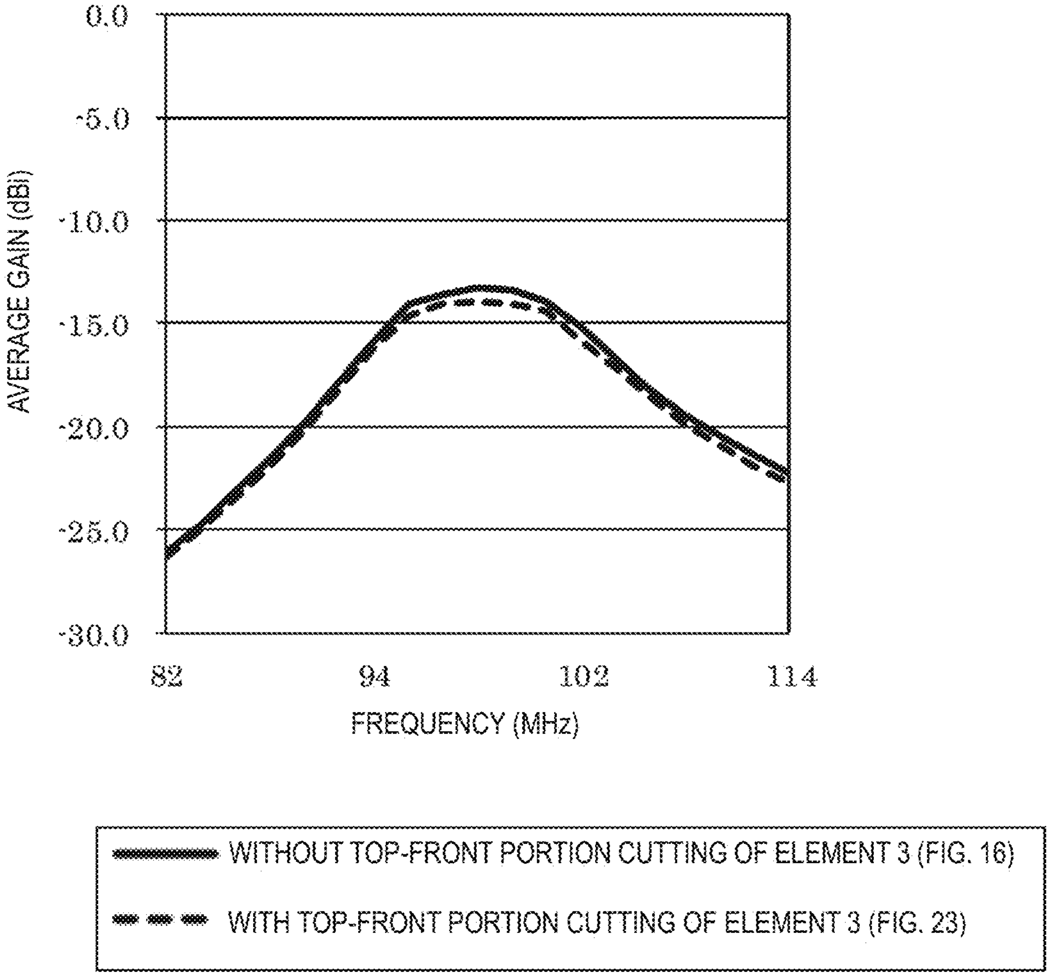
FIG. 24 is a characteristic diagram produced by a simulation and showing a relationship between the frequency and the average gain in the FM band of each of the antenna device 1 shown in FIG. 16 and the antenna device shown in FIG. 23.

FIG. 23 is a simplified left side view of an antenna device that is different from the antenna device 1 shown in FIG. 16 in that a top-front portion of the AM/FM capacitance loading element 3 is cut away obliquely. The oblique cutting direction in FIG. 23 is such that the front edges of the AM/FM capacitance loading element 3 recede rearward as the position goes up. FIG. 24 is a characteristic diagram produced by a simulation and showing a relationship between the frequency and the average gain in the FM band of each of the antenna device 1 shown in FIG. 16 (without top-front portion cutting of the AM/FM capacitance loading element 3) and the antenna device shown in FIG. 23 (with top-front portion cutting of the AM/FM capacitance loading element 3). As shown in FIG. 24, the average gain in the FM frequency band is decreased when the interval, in the front-rear direction, between the top portion of the AM/FM capacitance loading element 3 and the top portion of the band III capacitance loading element 8 by cutting away a top-front portion of the AM/FM capacitance loading element 3. Thus, in doing the cutting to increase the interval, in the front-rear direction, between the top portion of the AM/FM capacitance loading element 3 and the top portion of the band III capacitance loading element 8, it is desirable to cut away a bottom portion than a top portion.

This embodiment can provide the following advantages.

(1) Since the band III capacitance loading element 8 has the top portion **8*b* or 8*d*, the area of the band III capacitance loading element 8 can be made larger than in a case the band III capacitance loading element 8 does not have the top portion 8*b* or 8*d* if the band III capacitance loading element 8 having the top portion 8*b* or 8*d* has the same height as the height of the band III capacitance loading element 8 without the top portion 8*b* or 8*d*, whereby the average gain in the band III frequency band of the antenna device 1 can be improved (see FIGS. 8 and 11**).

(2) Where the band III capacitance loading element 8 has the additional side portion that is disposed above the metal base 19 and is connected to a side of the top portion **8*b* opposite to a side of the top portion 8*b* to which the side portion 8*a* is connected (i.e., the additional side portion (capacitance loading portion) that is connected to the right edge of the top portion 8*b* so as to be opposed to the side portion 8*a* in the same height range as the side portion 8*a*), the area of the band III capacitance loading element 8 is increased in compared with a case it does not have the additional side portion, whereby the average gain in the band III frequency band can be improved (see FIG. 9**).

(3) Where the band III capacitance loading element 8 is a single metal sheet component including the top portion **8*b* (see FIG. 6), the productivity of the band III capacitance loading element 8 is higher than in a case that is it not a single metal sheet component (see FIG. 10**).

(4) Since the L-band element 16, the band III capacitance loading element 8, and the AM/FM capacitance loading element 3 are arranged in this order from the front side to the rear side in the antenna device 1 (the third antenna, the second antenna, and the first antenna are arranged in this order from the front side to the rear side), miniaturization (height reduction) can be attained while reduction of the antenna gain is suppressed.

(5) Since the ranges of presence, in the front-rear direction, of the band III capacitance loading element 8 and the AM/FM capacitance loading element 3 do not overlap with each other (the ranges of presence of the first antenna and the second antenna in the front-rear direction do not overlap with each other), reduction of the average gain of the antenna device 1 in the FM frequency band can be suppressed (see FIG. 18). Likewise, since the ranges of presence, in the front-rear direction, of the band III capacitance loading element 8 and the L-band element 16 do not overlap with each other (the ranges of presence of the second antenna and the third antenna in the front-rear direction do not overlap with each other), reduction of the average gain of the antenna device 1 in the band III frequency band can be suppressed.

(6) Since the AM/FM helical element 5 is provided for reception in the AM and FM frequency bands and the band III helical element 10 is provided for reception in the band III frequency band, wave separation on a circuit is not necessary. Furthermore, it is possible to prevent integer multiples of the resonance frequency of one of the AM/FM helical element 5 and the band III helical element 10 from being in the resonance frequency range of the other by adjusting their inductances, which is advantageous to increase of sensitivity.

(7) The LC circuit shown in FIG. 25 can suppress the coupling between the AM/FM capacitance loading element 3 and the band III capacitance loading element 8 and thereby suppress the reduction of the average gain in the FM frequency band. The capacitor C shown in FIG. 26 can suppress the coupling between the AM/FM capacitance loading element 3 and the band III capacitance loading element 8 and thereby suppress the reduction of the average gains in the AM and the FM frequency bands.

Embodiment 2

Figure 27:
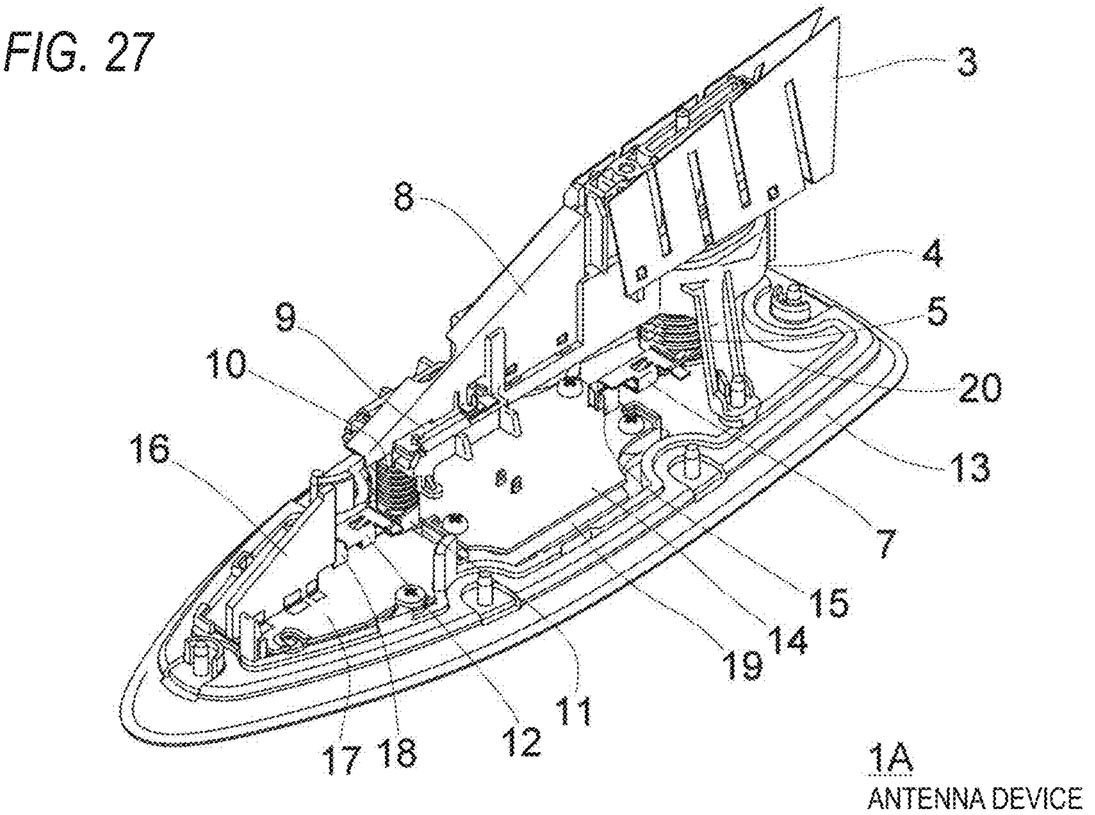
FIG. 27 is a perspective view of an antenna device 1A according to a second embodiment of the invention with the outer case 2 omitted.

FIG. 27 is a perspective view of an antenna device 1A according to a second embodiment of the invention with the outer case 2 omitted. The antenna device 1A is different from the antenna device 1 according to the first embodiment in that the shape of the AM/FM capacitance loading element 3 is changed into a meandering shape and the AM/FM capacitance loading element 3 is divided into two parts in the left-right direction (separated from each other at the top), and is the same as the antenna device 1 in the other points. Through the AM/FM capacitance loading element 3 has the shape shown in FIG. 27, this embodiment can provide the same advantages as the above-described embodiment. Furthermore, since the AM/FM capacitance loading element 3 of the antenna device 1A is divided in the left-right direction and has a space at the top, the coupling between the band III capacitance loading element 8 and the AM/FM capacitance loading element 3 is weakened in compared with the case that the AM/FM capacitance loading element 3 is not divided at the top (does not have a space at the top).

In the first and second embodiments, the band III capacitance loading element 8, the band III helical element 10, and the L-band element 16 may be integrated together by, for example, mounting them on a single board. In this case, it is desirable that a band elimination filter (BEF) for interrupting a signal in the L-band frequency band is inserted between a portion corresponding to the band III capacitance loading element 8 and the band III helical element 10 and a portion corresponding to the L-band element 16.

In the first and second embodiments, the L-band element 16 may be eliminated in the case where the L-band frequency band is not used. In this case, the elimination of the L-band element 16 is advantageous to miniaturization. Also in this case, for the above-described reasons, it is desirable that the band III capacitance loading element 8 and the AM/FM capacitance loading element 3 are disposed in this order from the front side.

Embodiment 3

Figure 28:
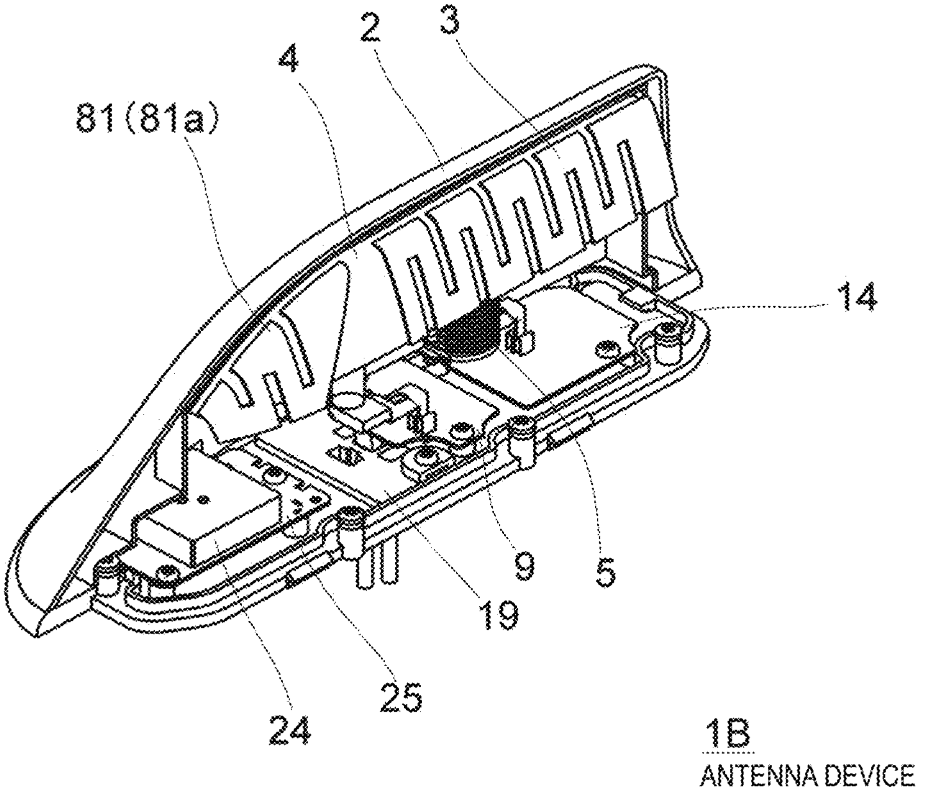
FIG. 28 is a perspective view of an antenna device 1B according to a third embodiment of the invention with half of the outer case 2 cut away.
Figure 29:
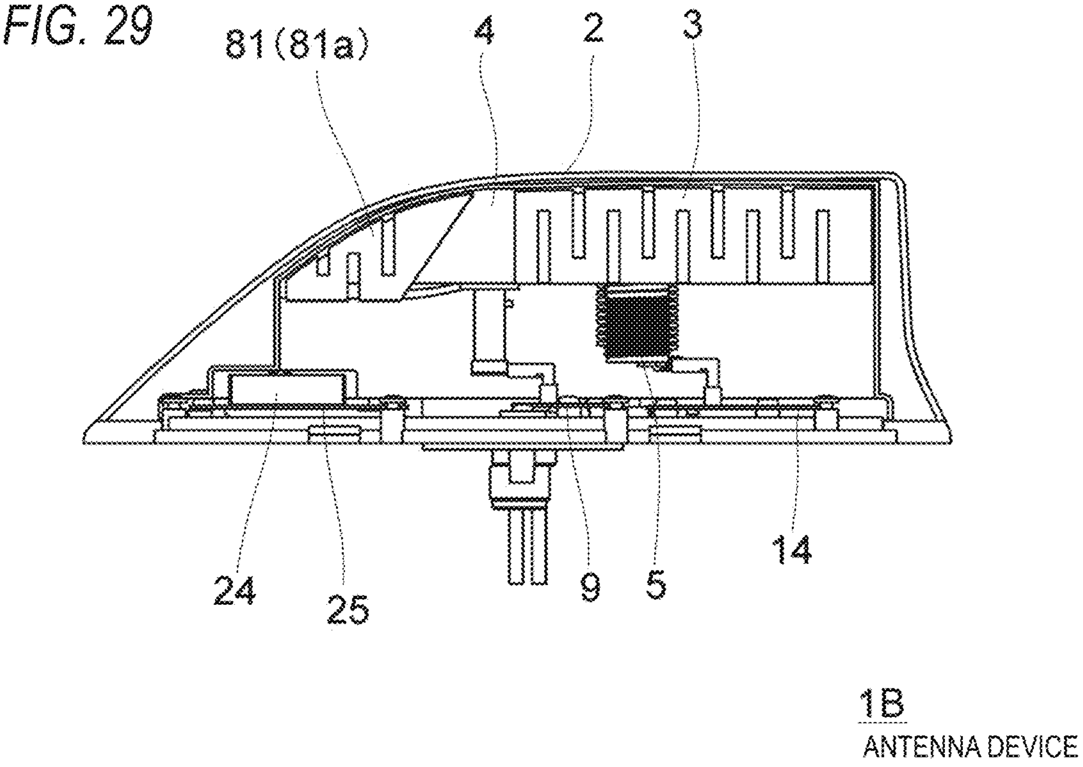
FIG. 29 is a left side view of the same.
Figure 30:
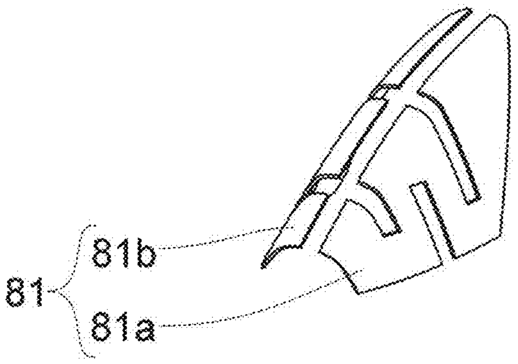
FIG. 30 is a perspective view of a band III capacitance loading element 81 shown in FIG. 28.
Figure 31:
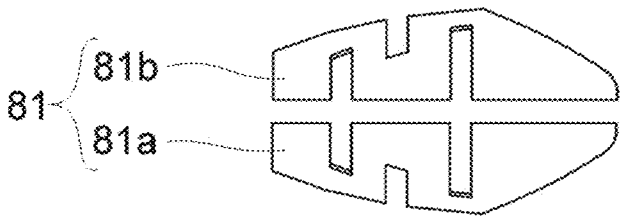
FIG. 31 is a plan view of the same.
Figure 32:
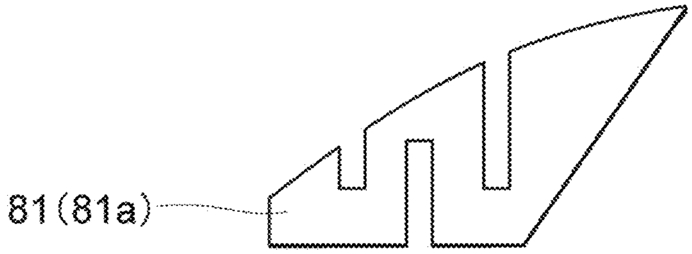
FIG. 32 is a left side view of the same.

FIG. 28 is a perspective view of an antenna device 1B according to a third embodiment of the invention, in which a half section of the outer case 2 is shown. FIG. 29 is a left side view of the same. FIG. 30 is a perspective view of a band III capacitance loading element 81 shown in FIG. 28. FIG. 31 is a plan view of the same. FIG. 32 is a left side view of the same. Differences from the antenna device 1A shown in FIG. 27 will mainly be described below.

Whereas the antenna device 1B does not have the L-band element 16, it has a GNSS (Global Navigation Satellite System) antenna 24. The GNSS antenna 24 is mounted on a GNSS antenna board 25. The band III capacitance loading element 81 includes a left-side element 81*a* and a right-side element (additional side portion) 81*b* as a third portion. In the illustrated example, the left-side element 81*a* and the right-side element 81*b* are shaped so as to be symmetrical with respect to a plane that is perpendicular to the left-right direction, both have a meandering shape, are opposed to each other in the left-right direction, and are two divisional parts (no top portion is provided). The left-side element 81*a* corresponds to a configuration that the band III capacitance loading element 8 shown in FIGS. 13 and 14 is modified into a meandering shape. The band III capacitance loading element 81 and the GNSS antenna 24 overlap to each other at least partially in the front-rear direction and the left-right direction (overlap to each other at least partially when viewed from above). To prevent interference between the band III capacitance loading element 81 and the GNSS antenna 24, it is desirable that their length in the top-bottom direction (along the holder 4) is shorter than λ/2, wherein the symbol "λ" is the wave length of the GNSS antenna 24. It is more desirable that their length in the top-bottom direction is shorter than or equal to λ/4.

The band III capacitance loading element 81 includes the right-side element 81*b* in addition to the left-side element 81*a*. Thus, as seen from the above-described result shown in FIG. 9, the average gain of the antenna device 1B in the band III frequency band is higher than that of an antenna device not having the right-side element 81*b* in the case where the lengths of their band III capacitance loading elements 81 in the front-rear direction are the same. Where the average gains in the band III frequency band are set the same, the length of the band III capacitance loading element 81 in the front-rear direction (and hence the length of the antenna device 1B in the front-rear direction) can be made shorter than that of the band III capacitance loading element not having the right-side element 81*b*.

The rear edge of each of the left-side element 81*a* and the right-side element 81*b* of the band III capacitance loading element 81 is shaped so as to advance forward (i.e., be separated away from the AM/FM capacitance loading element 3) as the position goes down (toward the metal base 19); in the example shown in FIGS. 28-32, the rear edges are cut obliquely and straightly. As a result, the interval, in the front-rear direction, between the bottom of the AM/FM capacitance loading element 3 and the bottom of the band III capacitance loading element 81 can be made longer, whereby the average gain in the FM frequency band can be improved accordingly.

Figure 33:
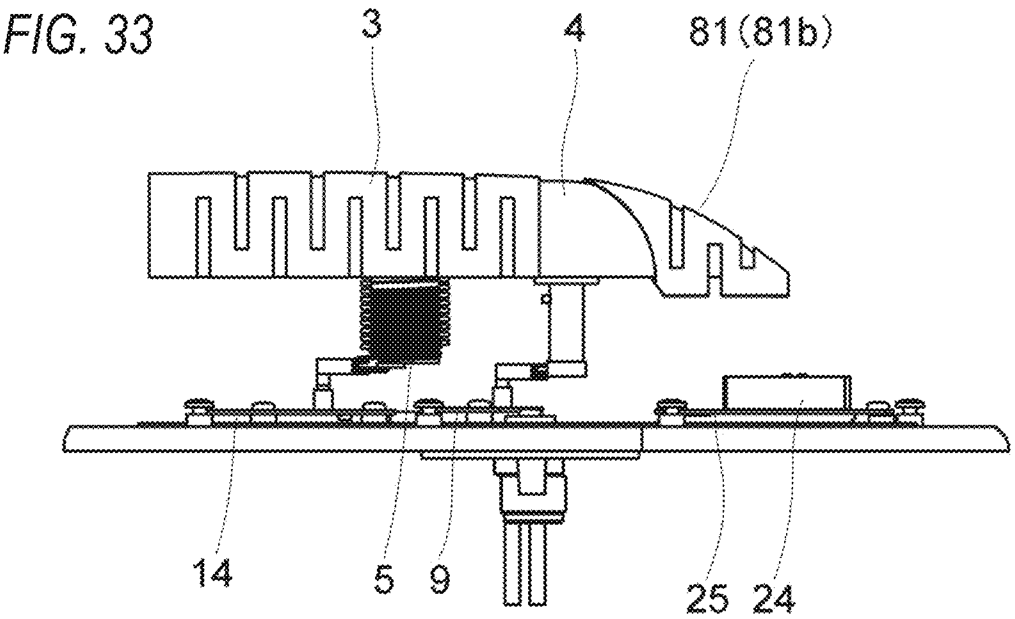
FIG. 33 is a right side view, with the outer case 2 omitted, of an antenna device 1B in which bottom-rear portions of a left-side element 81*a* and a right-side element 81*b* of a band III capacitance loading element 81 are cut away so as to leave circular-arc-shaped edges, respectively.
Figure 34:
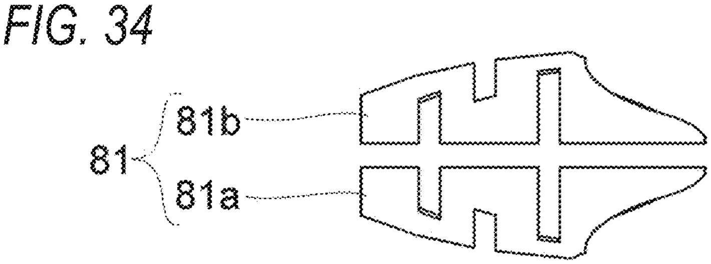
FIG. 34 is a plan view of the band III capacitance loading element 81 shown in FIG. 33.
Figure 35:
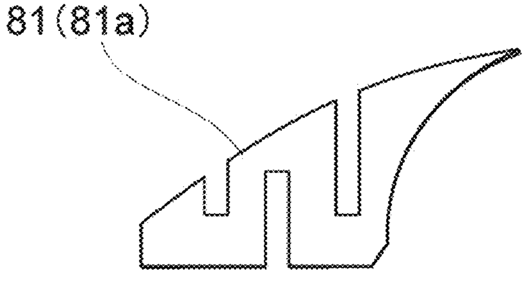
FIG. 35 is a left side view of the same.
Figure 36:
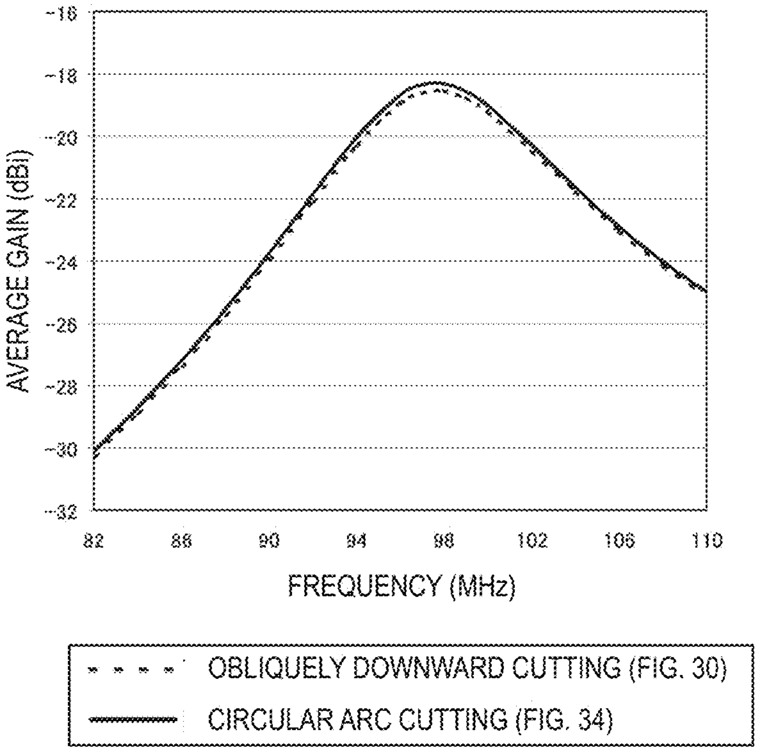
FIG. 36 is a characteristic diagram produced by a simulation and showing a relationship between the frequency and the average gain in the FM band of each of the antenna device 1B in which bottom-rear portions of a left-side element 81*a* and a right-side element 81*b* are both cut away obliquely in straight and the antenna device 1B in which bottom-rear portions of the left-side element 81*a* and the right-side element 81*b* are both cut away so as to leave circular-arc-shaped edges, respectively.

The rear edge of each of the left-side element 81*a* and the right-side element 81*b* of the band III capacitance loading element 81 may be cut so as to be shaped like a circular arc (a circular arc that is concave toward the side of the AM/FM capacitance loading element 3) as shown in FIGS. 33-35 instead of being cut obliquely and straightly as shown in FIGS. 28-32. FIG. 36 is a characteristic diagram produced by a simulation and showing a relationship between the frequency and the average gain in the FM band of each of the antenna device 1B in which bottom-rear portions of the left-side element 81*a* and the right-side element 81*b* are both cut away obliquely in straight and the antenna device 1B in which bottom-rear portions of the left-side element 81*a* and the right-side element 81*b* are both cut away so as to leave circular-arc-shaped edges, respectively. As shown in FIG. 36, there are no large changes in the average gain in the FM band between the band III capacitance loading element 81 in which the rear edges of the left-side element 81*a* and the right-side element 81*b* are obliquely cut in straight, and the band III capacitance loading element 81 in which the rear edges of the left-side element 81*a* and the right-side element 81*b* are cut into the circular-arc-shape. As a result, the average gain in the FM band can be improved by cutting the rear edges of the left-side element 81*a* and the right-side element 81*b* into the circular-arc-shape in compared with the case that the rear edges of the left-side element 81*a* and the right-side element 81*b* are perpendicular to the top-bottom direction when viewed from the side without being cut into the circular-arc-shape. Incidentally, the same advantages as in the case that circular-arc-shaped rear edges are formed can be obtained by shaping the rear edges of the left-side element 81*a* and the right-side element 81*b* of the band III capacitance loading element 81 into a non-circular-arc shape that is concave toward the side of the AM/FM capacitance loading element 3.

Figure 37:
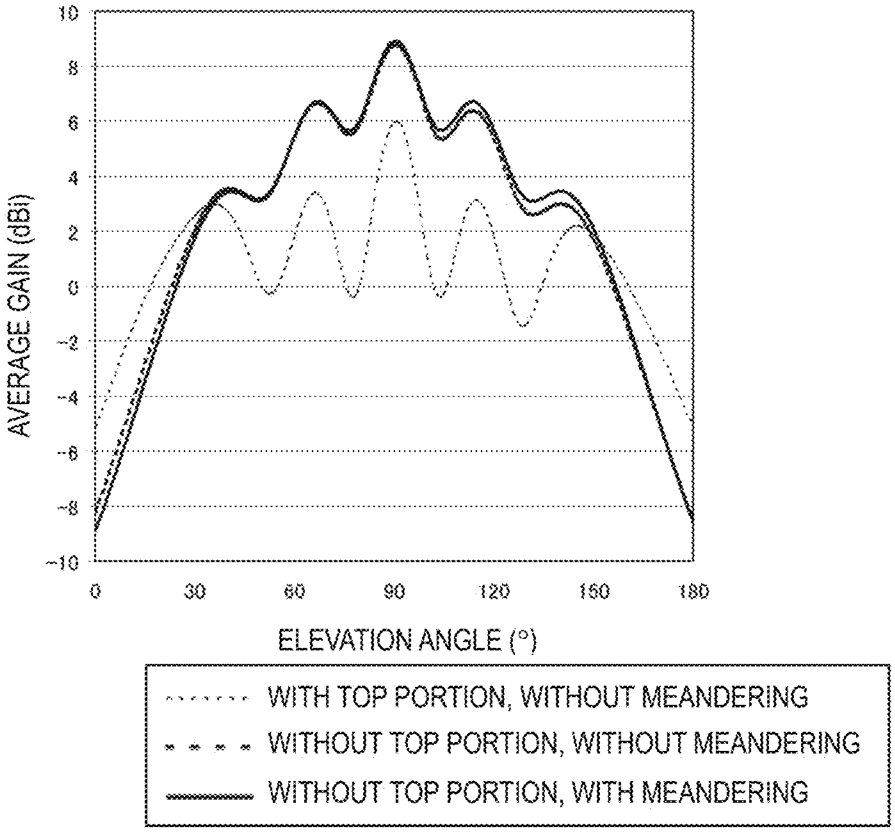
FIG. 37 is a characteristic diagram produced by a simulation and showing a relationship between the elevation angle and the gain of a GNSS antenna 24 of each of an antenna device 1B in which the top edges of the left-side element 81*a* and the right-side element 81*b* of the band III capacitance loading element 81 are connected to each other by a top portion and the left-side element 81*a* and the right-side element 81*b* do not have a meandering shape, an antenna device 1B in which the top edges of the left-side element 81*a* and the right-side element 81*b* are not connected to each other and the left-side element 81*a* and the right-side element 81*b* do not have a meandering shape, and the antenna device 1B in which the top edges of the left-side element 81*a* and the right-side element 81*b* are not connected to each other and the left-side element 81*a* and the right-side element 81*b* have a meandering shape (see FIGS. 28-32).

FIG. 37 is a characteristic diagram produced by a simulation and showing a relationship between the elevation angle and the gain of the GNSS antenna 24 of each of an antenna device 1B in which the top edges of the left-side element 81*a* and the right-side element 81*b* of the band III capacitance loading element 81 are connected to each other by a top portion therebetween and the left-side element 81*a* and the right-side element 81*b* do not have a meandering shape, an antenna device 1B in which the top edges of the left-side element 81*a* and the right-side element 81*b* are not connected to each other and the left-side element 81*a* and the right-side element 81*b* do not have a meandering shape, and the antenna device 1B in which the top edges of the left-side element 81*a* and the right-side element 81*b* are not connected to each other and the left-side element 81*a* and the right-side element 81*b* have a meandering shape (see FIGS. 28-32). In FIG. 37, an elevation angle 0° means the rightward direction and an elevation angle 180° means the leftward direction. As seen from FIG. 37, in the case where the GNSS antenna 24 is covered with the band III capacitance loading element 81 from above, the band III capacitance loading element 81 being divided into two parts (i.e., there is no top portion that connects the top edges of the left-side element 81*a* and the right-side element 81*b*) provides an effect of increasing the average gain of the GNSS antenna 24. It is also seen from FIG. 37, in the case where the GNSS antenna 24 is covered with the band III capacitance loading element 81 from above, the average gain of the GNSS antenna 24 is larger in the case where the left-side element 81*a* and the right-side element 81*b* have a meandering shape than in the case where the left-side element 81*a* and the right-side element 81*b* do not have the meandering shape.

Figure 38:
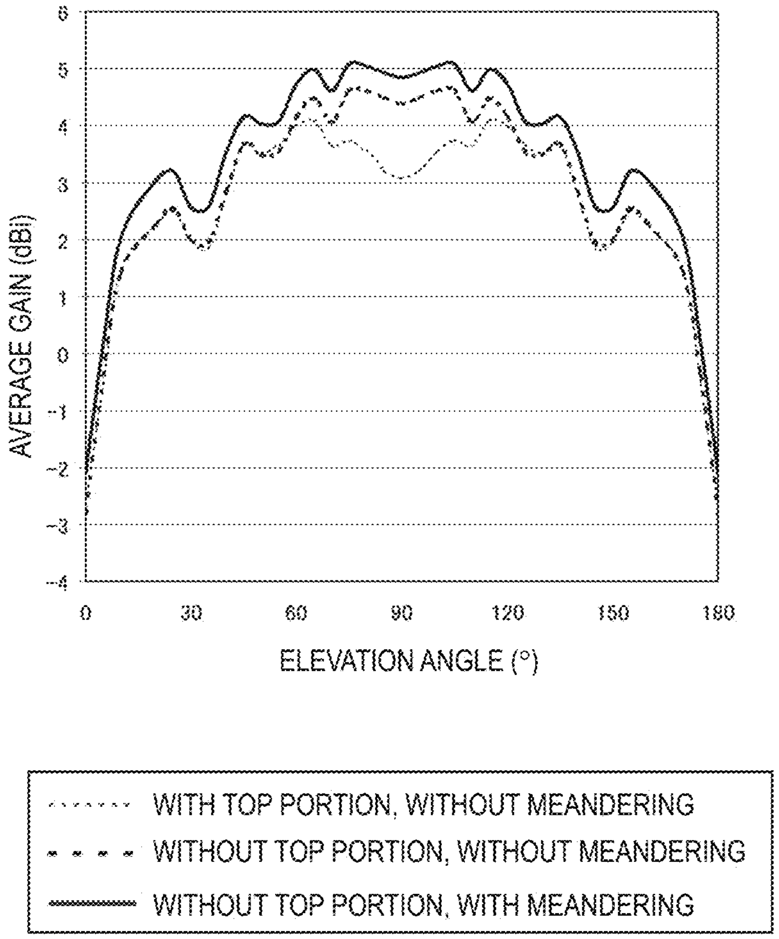
FIG. 38 is a characteristic diagram produced by a simulation and showing a relationship between the elevation angle and the gain of an SXM (Sirius-XM) antenna as a replacement of the GNSS antenna 24 of each of an antenna device 1B in which the top edges of the left-side element 81*a* and the right-side element 81*b* of the band III capacitance loading element 81 are connected to each other by a top portion and the left-side element 81*a* and the right-side element 81*b* do not have a meandering shape, an antenna device 1B in which the top edges of the left-side element 81*a* and the right-side element 81*b* are not connected to each other and the left-side element 81*a* and the right-side element 81*b* do not have a meandering shape, and the antenna device 1B in which the top edges of the left-side element 81*a* and the right-side element 81*b* are not connected to each other and the left-side element 81*a* and the right-side element 81*b* have a meandering shape (see FIGS. 28-32).

In this embodiment, the GNSS antenna 24 may be omitted if it is not necessary. Where the GNSS antenna 24 is not provided or its gain can be made sufficiently large, the band III capacitance loading element 81 needs not be divided into two parts in the left-right direction (i.e., the top edges of the left-side element 81*a* and the right-side element 81*b* may be connected to each other by a top portion). Also, the left-side element 81*a* and the right-side element 81*b* may have a shape other than a meandering shape. Where sufficiently large average gain values can be secured in the FM band, the rear edges of the band III capacitance loading element 81 may be parallel with the top-bottom direction when viewed from the side. An SXM antenna may be provided in place of the GNSS antenna 24. FIG. 38 is a characteristic diagram produced by a simulation and showing a relationship between the elevation angle and the gain of an SXM (Sirius-XM) antenna as a replacement of the GNSS antenna 24 of each of an antenna device 1B in which the top edges of the left-side element 81*a* and the right-side element 81*b* of the band III capacitance loading element 81 are connected to each other by a top portion therebetween and the left-side element 81*a* and the right-side element 81*b* do not have a meandering shape, an antenna device 1B in which the top edges of the left-side element 81*a* and the right-side element 81*b* are not connected to each other and the left-side element 81*a* and the right-side element 81*b* do not have a meandering shape, and the antenna device 1B in which the top edges of the left-side element 81*a* and the right-side element 81*b* are not connected to each other and the left-side element 81*a* and the right-side element 81*b* have a meandering shape (see FIGS. 28-32). In FIG. 38, an elevation angle 0° means the rightward direction and an elevation angle 180° means the leftward direction. As seen from FIG. 38, in the case where the SXM antenna is covered with the band III capacitance loading element 81 from above, the band III capacitance loading element 81 being divided into two parts (i.e., there is no top portion that connects the top edges of the left-side element 81*a* and the right-side element 81*b*) and the left-side element 81*a* and the right-side element 81*b* having a meandering shape each provide an effect of increasing the average gain of the SXM antenna.

Although the invention has been described above using the embodiments as examples, it would be understood by those skilled in the art that the individual constituent elements and the individual working or treatment processes of the embodiments can be modified in various manners within the confines of the claims. Modifications will be described below.

The LC circuit shown in FIG. 25 or the capacitor C shown in FIG. 26 may be omitted if it is not necessary in terms of design. Any filter or the like other than the LC circuit shown in FIG. 25 or the capacitor C shown in FIG. 26 may be used as long as it passes a signal in the band III frequency band. Specific numerical values (frequencies and angles), shapes, etc. used in the embodiments are just examples and can be changed as appropriate according to required specifications.

Whereas there exists the above tendency of installing plural antennas in a common case, there is demand for miniaturization. This makes it difficult to secure gains of antenna.

The present invention provides an antenna device that can be miniaturized while suppressed in reduction of antenna gains.

The invention can provide an antenna device that can be miniaturized while suppressed in reduction of antenna gains.

What is claimed:

1. An antenna device comprising:

a first antenna and a second antenna which are provided in a case, wherein the first antenna for a first frequency band includes a capacitance loading element, the second antenna is for a second frequency band, the second frequency band is higher than the first frequency band, a rear end of the second antenna is positioned further toward a rear side than a front end portion of the capacitance loading element, and a front end of the second antenna is positioned further toward a front side than the front end portion of the capacitance loading element, and a first feeding point of the first antenna does not overlap with the capacitance loading element when viewed in a vertical direction.

2. The antenna device according to claim 1, further comprising a first board; and a second board which is a separated member from the first board, wherein the first board includes the first feeding point, and the second board includes a second feeding point.

3. The antenna device according to claim 2, wherein the first board is opposed to the capacitance loading element.

4. The antenna device according to claim 1, wherein the capacitance loading element is a metal sheet component.

5. The antenna device according to claim 1, wherein the second antenna includes a first part and a second part, and the second part of the second antenna is a part bent from the first part in a left-right direction.

6. An antenna device comprising:

a first antenna and a second antenna which are provided in a case, wherein the first antenna for a first frequency band includes a capacitance loading element, the second antenna is for a second frequency band, the second frequency band is higher than the first frequency band, a rear end of the second antenna is positioned further toward a rear side than a front end portion of the capacitance loading element, and a front end of the second antenna is positioned further toward a front side than the front end portion of the capacitance loading element, and a second feeding point of the second antenna does not overlap with the capacitance loading element when viewed in a vertical direction.

7. The antenna device according to claim 6, further comprising a first board; and a second board which is a separated member from the first board, wherein the first board includes a first feeding point, and the second board includes the second feeding point.

8. The antenna device according to claim 7, wherein the first board is opposed to the capacitance loading element.

9. The antenna device according to claim 6, wherein the capacitance loading element is a metal sheet component.

10. The antenna device according to claim 6, wherein the second antenna includes a first part and a second part, and the second part of the second antenna is a part bent from the first part in a left-right direction.

* * * * *